US010416940B2

(12) United States Patent
Asakimori et al.

(10) Patent No.: US 10,416,940 B2
(45) Date of Patent: Sep. 17, 2019

(54) IMAGE PROCESSING APPARATUS, IMAGE PROCESSING SYSTEM, AND IMAGE PROCESSING METHOD FOR INTERPRETING CONTENT OBTAINED FROM A WEB BROWSER AND DISPLAYING A SCREEN BASED ON THE INTERPRETED CONTENT

(71) Applicants: Hiroki Asakimori, Tokyo (JP); Tomohiro Kuroyanagi, Tokyo (JP); Yuuta Saitoh, Tokyo (JP); Nobuya Monden, Kanagawa (JP); Yohsuke Utoh, Kanagawa (JP); Keiichiro Hitomi, Kanagawa (JP)

(72) Inventors: Hiroki Asakimori, Tokyo (JP); Tomohiro Kuroyanagi, Tokyo (JP); Yuuta Saitoh, Tokyo (JP); Nobuya Monden, Kanagawa (JP); Yohsuke Utoh, Kanagawa (JP); Keiichiro Hitomi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/921,713

(22) Filed: Mar. 15, 2018

(65) Prior Publication Data
US 2018/0267753 A1    Sep. 20, 2018

(30) Foreign Application Priority Data

Mar. 17, 2017  (JP) .................................. 2017-052276
Aug. 3, 2017   (JP) .................................. 2017-151160
(Continued)

(51) Int. Cl.
*G06F 3/12*       (2006.01)

(52) U.S. Cl.
CPC .......... *G06F 3/1246* (2013.01); *G06F 3/1207* (2013.01); *G06F 3/1256* (2013.01); *G06F 3/1287* (2013.01); *G06F 3/1298* (2013.01)

(58) Field of Classification Search
CPC .... G06F 3/1207; G06F 3/1246; G06F 3/1298; G06F 3/1287; G06F 3/1256; G06F 3/14;
(Continued)

(56) References Cited

U.S. PATENT DOCUMENTS 6,650,433 B1 * 11/2003 Keane ................... G06F 3/1211
                                                         358/1.15
7,106,469 B2 *  9/2006 Simpson ................ G06K 15/02
                                                         358/1.15
(Continued)

FOREIGN PATENT DOCUMENTS

JP    2007-087399    4/2007
JP    2011-141684    7/2011
(Continued)

*Primary Examiner* — Gabriel I Garcia
(74) *Attorney, Agent, or Firm* — Oblon, McClelland, Maier & Neustadt, L.L.P.

(57) ABSTRACT

Example embodiments of the present disclosure include image processing apparatus installed with a web browser that includes circuitry and an image processing device. The circuitry interprets content obtained from a web server connected to the image processing apparatus via a network, displays a screen based on the interpreted content, requests the web server to process according to a user input on the displayed screen, and requests the image processing device to perform predetermined image processing.

14 Claims, 31 Drawing Sheets

(30) Foreign Application Priority Data

Aug. 4, 2017 (JP) .................................. 2017-151827
Jan. 9, 2018 (JP) .................................. 2018-001503

(58) Field of Classification Search
CPC ........... H04N 1/00411; H04N 1/00464; H04N 1/00244; H04N 1/00204; H04N 2201/0094
USPC .................................. 358/1.1–1.18, 474, 468
See application file for complete search history.

(56) References Cited

U.S. PATENT DOCUMENTS

| | | | |
|---|---|---|---|
| 8,670,143 B2 * | 3/2014 | Sato | G06F 8/65 358/1.13 |
| 2003/0081246 A1 * | 5/2003 | Simpson | G06F 3/1204 358/1.15 |
| 2003/0112460 A1 * | 6/2003 | Simpson | G06F 3/1205 358/1.15 |
| 2011/0161823 A1 * | 6/2011 | Miyata | H04N 1/00204 715/733 |
| 2011/0202915 A1 | 8/2011 | Kuroyanagi | |
| 2011/0310409 A1 * | 12/2011 | Yukumoto | H04N 1/00244 358/1.9 |
| 2011/0317189 A1 | 12/2011 | Utoh | |
| 2012/0023451 A1 | 1/2012 | Kuroyanagi | |
| 2012/0151230 A1 | 6/2012 | Utoh | |
| 2012/0212761 A1 | 8/2012 | Kuroyanagi | |
| 2013/0100475 A1 | 4/2013 | Kuroyanagi | |
| 2014/0204416 A1 | 7/2014 | Kuroyanagi | |
| 2014/0247462 A1 | 9/2014 | Saitoh et al. | |
| 2014/0376054 A1 | 12/2014 | Kuroyanagi | |
| 2015/0070725 A1 | 3/2015 | Monden | |
| 2015/0242252 A1 | 8/2015 | Asakimori | |
| 2015/0261734 A1 | 9/2015 | Ohkuma | |
| 2015/0338898 A1 | 11/2015 | Yoshida et al. | |
| 2015/0358491 A1 | 12/2015 | Watanabe et al. | |
| 2016/0077771 A1 | 3/2016 | Monden | |
| 2016/0261760 A1 | 9/2016 | Aso et al. | |
| 2017/0078149 A1 | 3/2017 | Utoh | |
| 2017/0094119 A1 | 3/2017 | Fukasawa et al. | |
| 2017/0111531 A1 | 4/2017 | Mitsuke et al. | |
| 2017/0208191 A1 | 7/2017 | Asakimori | |
| 2017/0257510 A1 | 9/2017 | Kuroyanagi et al. | |

FOREIGN PATENT DOCUMENTS

| | | |
|---|---|---|
| JP | 2011-259464 | 12/2011 |
| JP | 2012-252466 | 12/2012 |
| JP | 2015-176481 | 10/2015 |
| JP | 2016-127301 | 7/2016 |

* cited by examiner

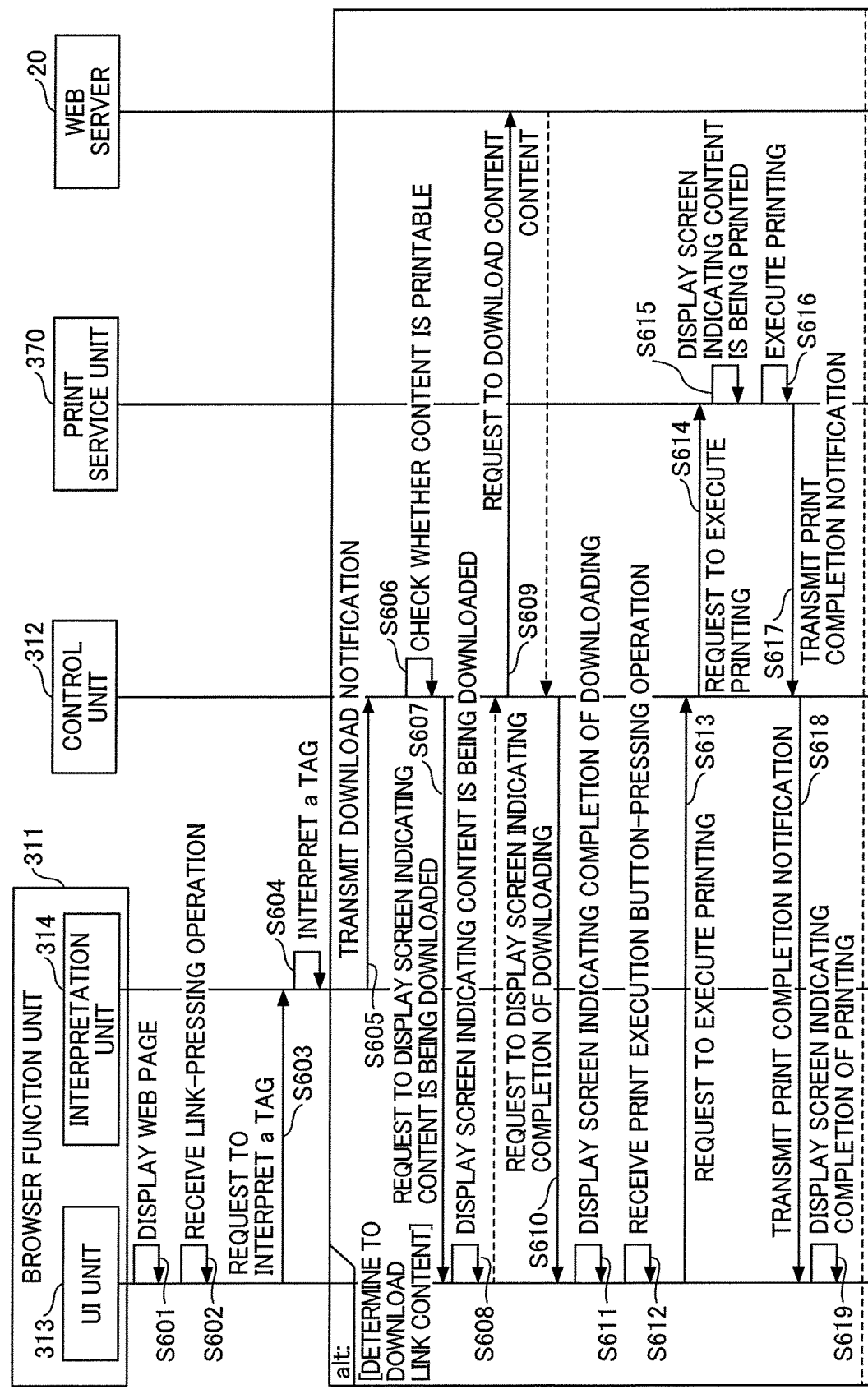

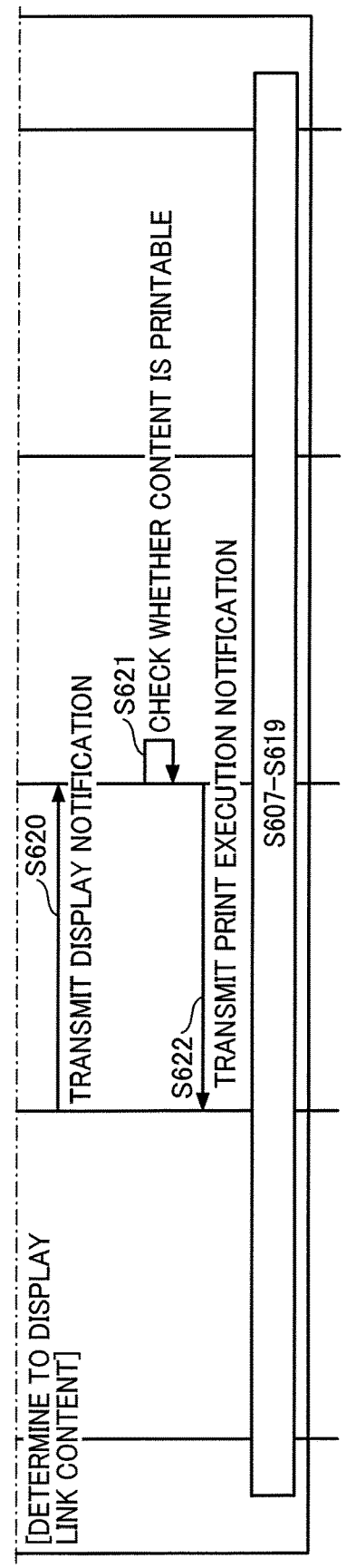

FIG. 8

```
<a href= "./file/myfile.pdf" download = "myfile.pdf" type= "application/pdf" >PDF File</a
```

FIG. 9

```
<?php
$fpath = './myfile.pdf';
$fname = 'myfile.pdf';
header("Content-Type: application/force-download");
header("Content-Length: ".filesize($fpath));
header("Content-disposition: attachment;
filename=\"".$fname."\"");
readfile($fpath);
?>
```

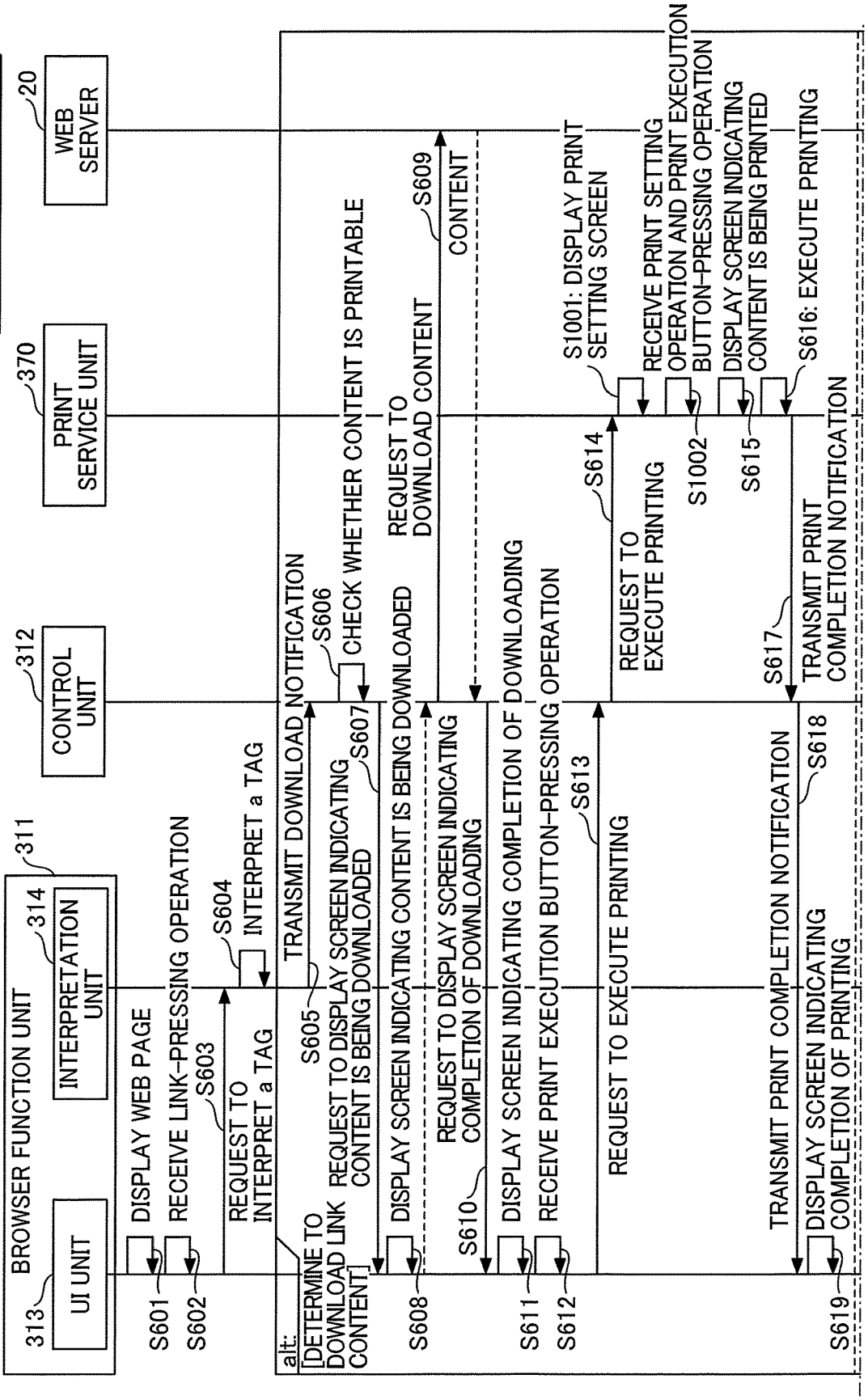

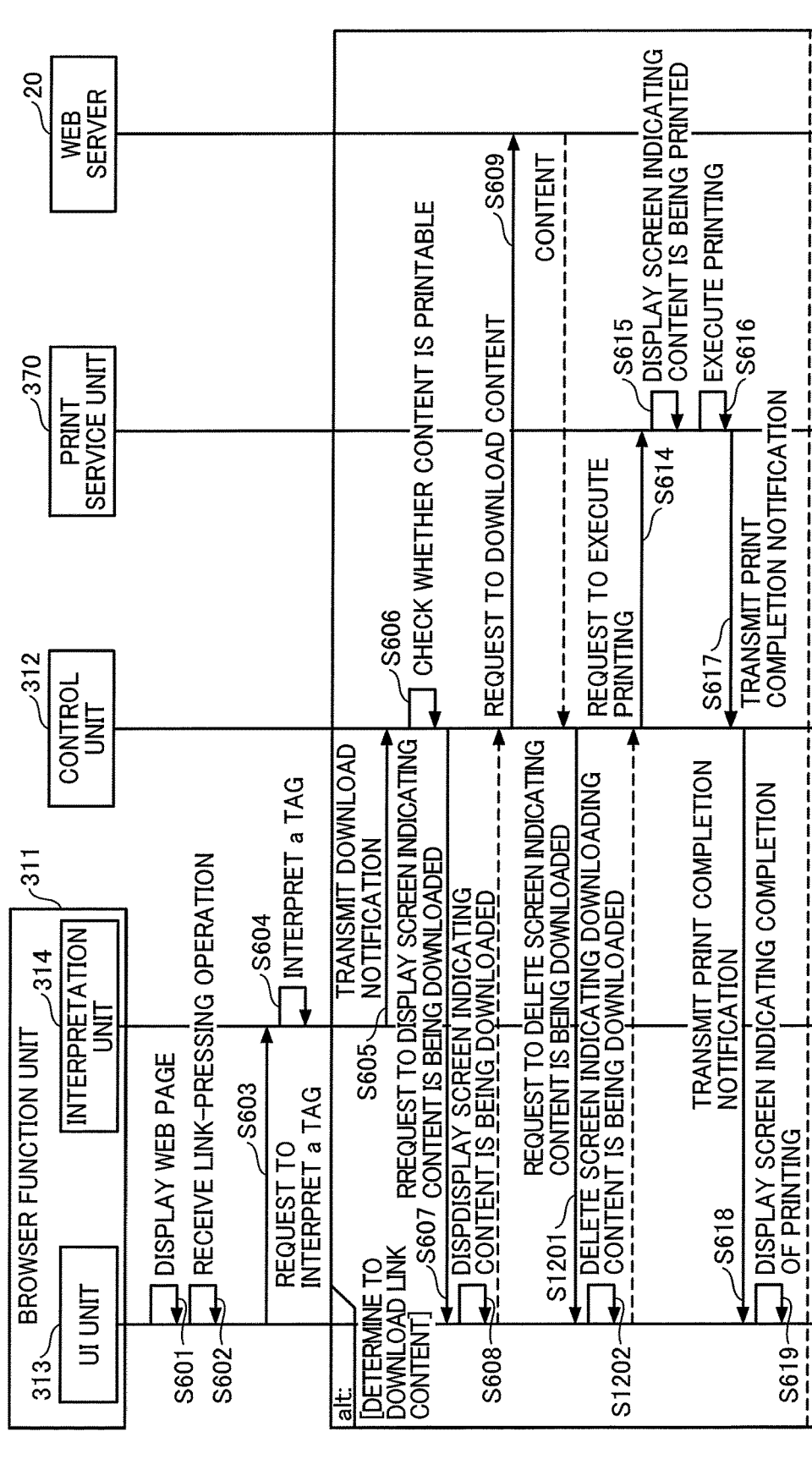

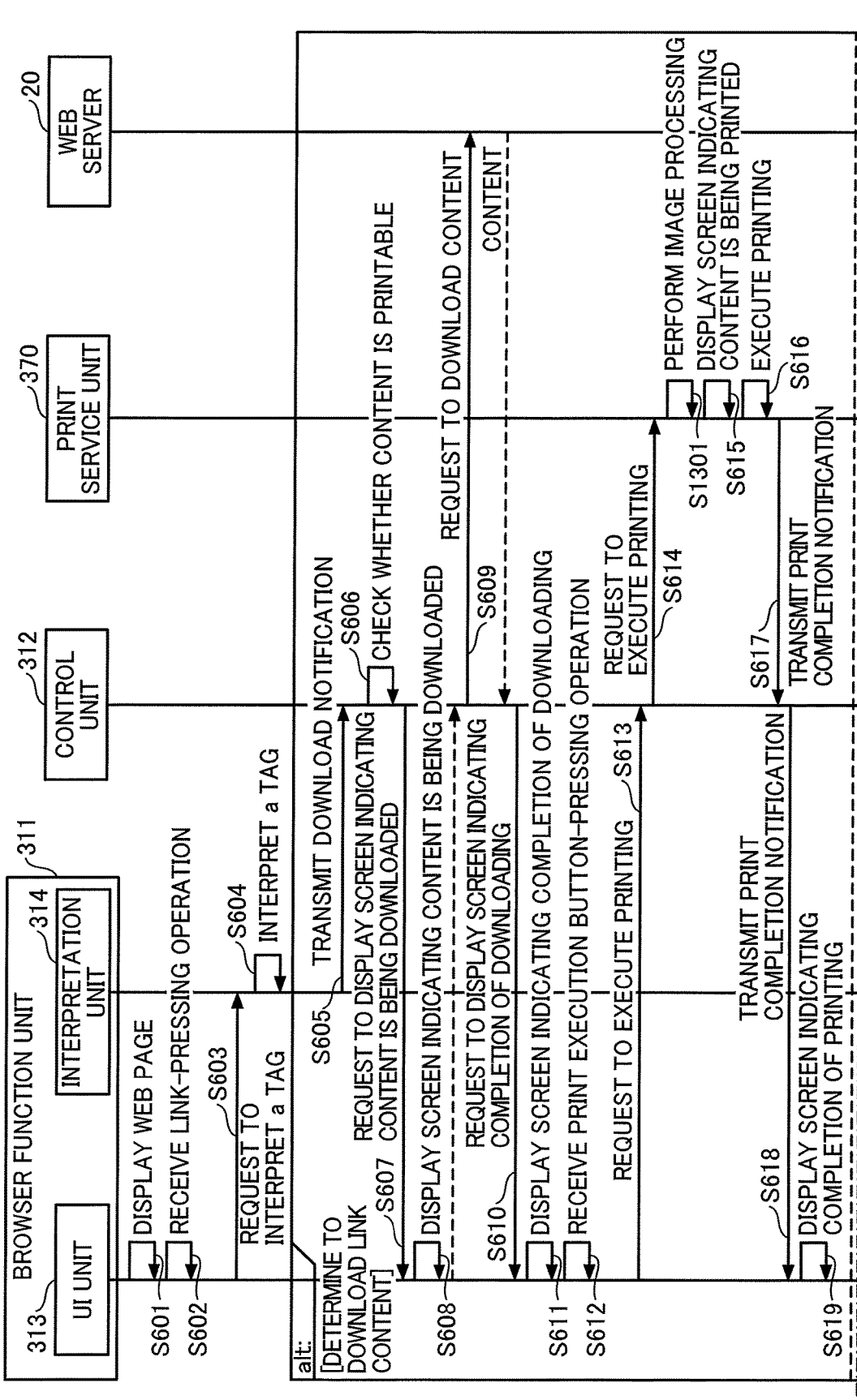

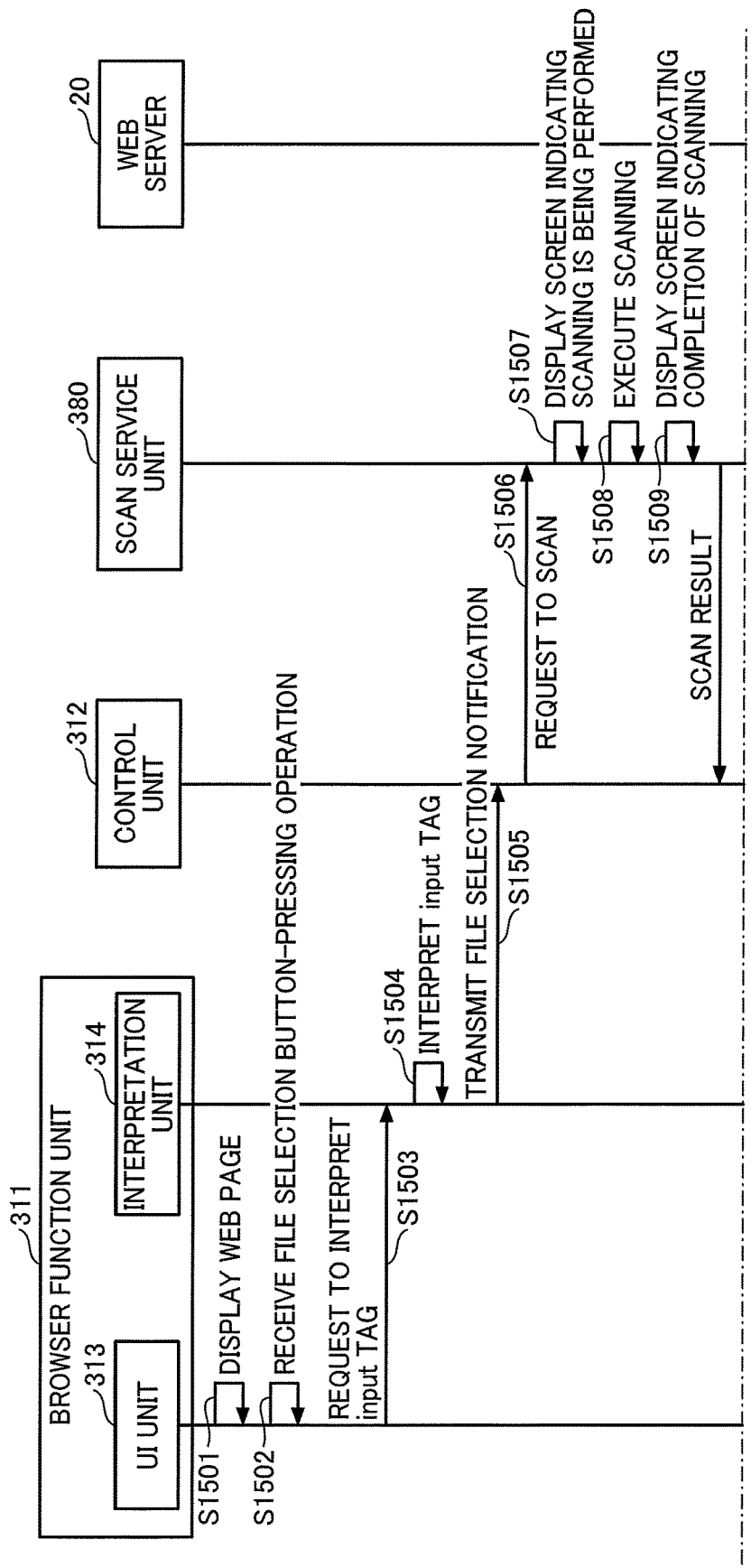

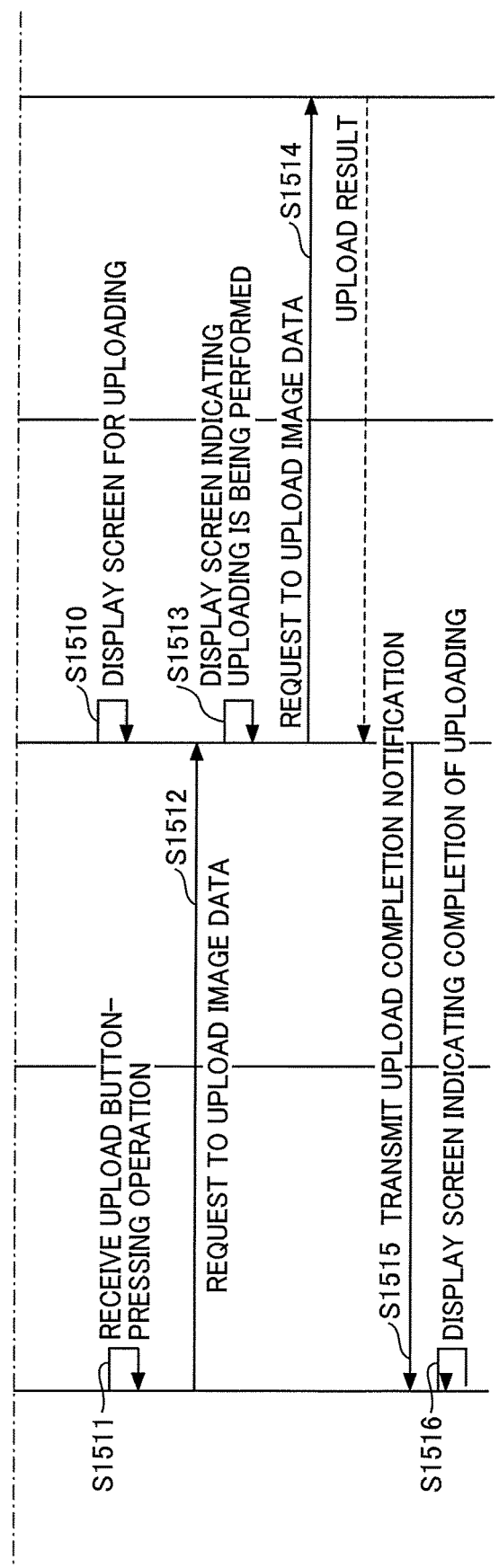

FIG. 17

```
<input type="file" name="upfile" accept="image/*" capture="camera" />
```

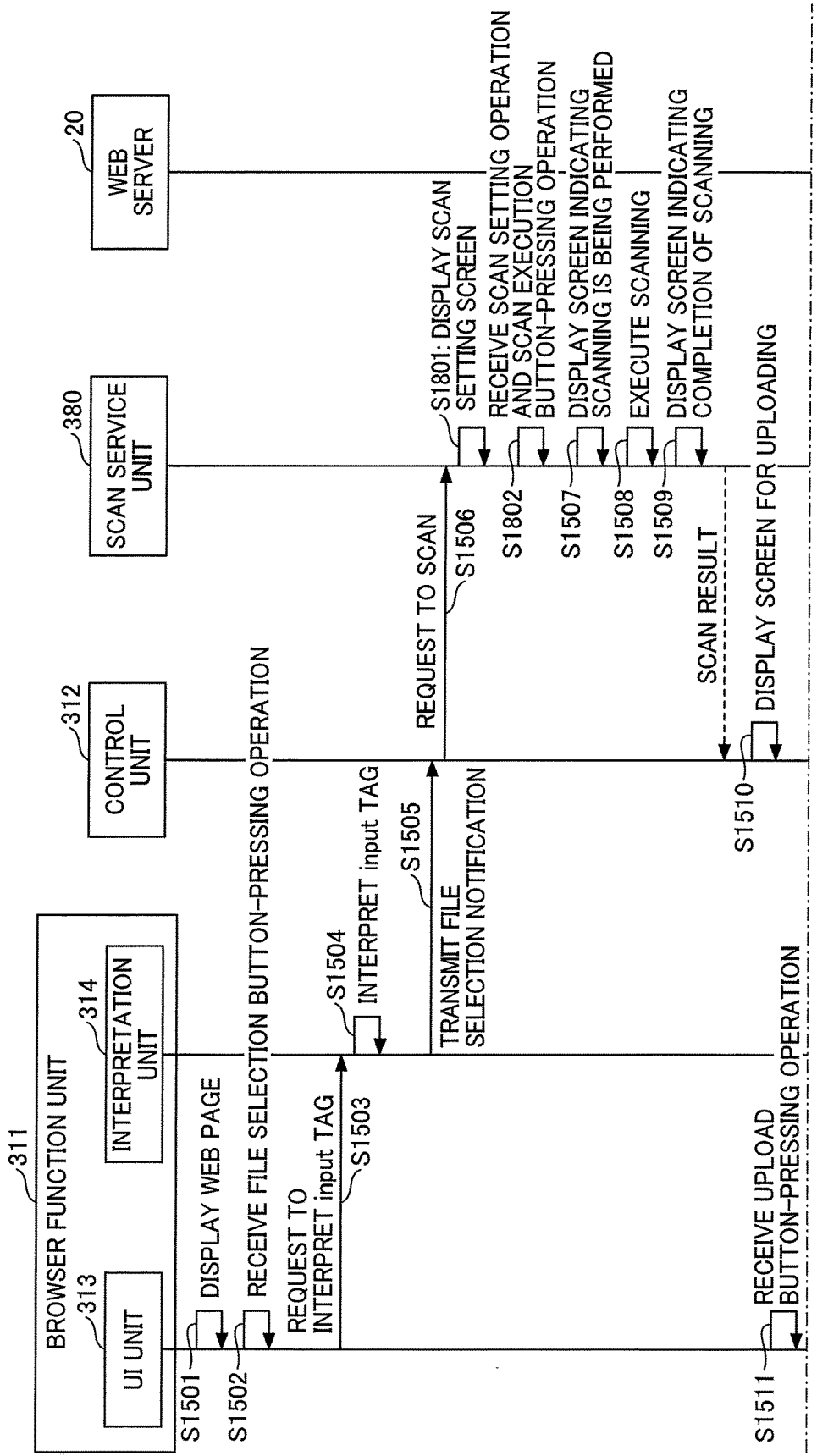

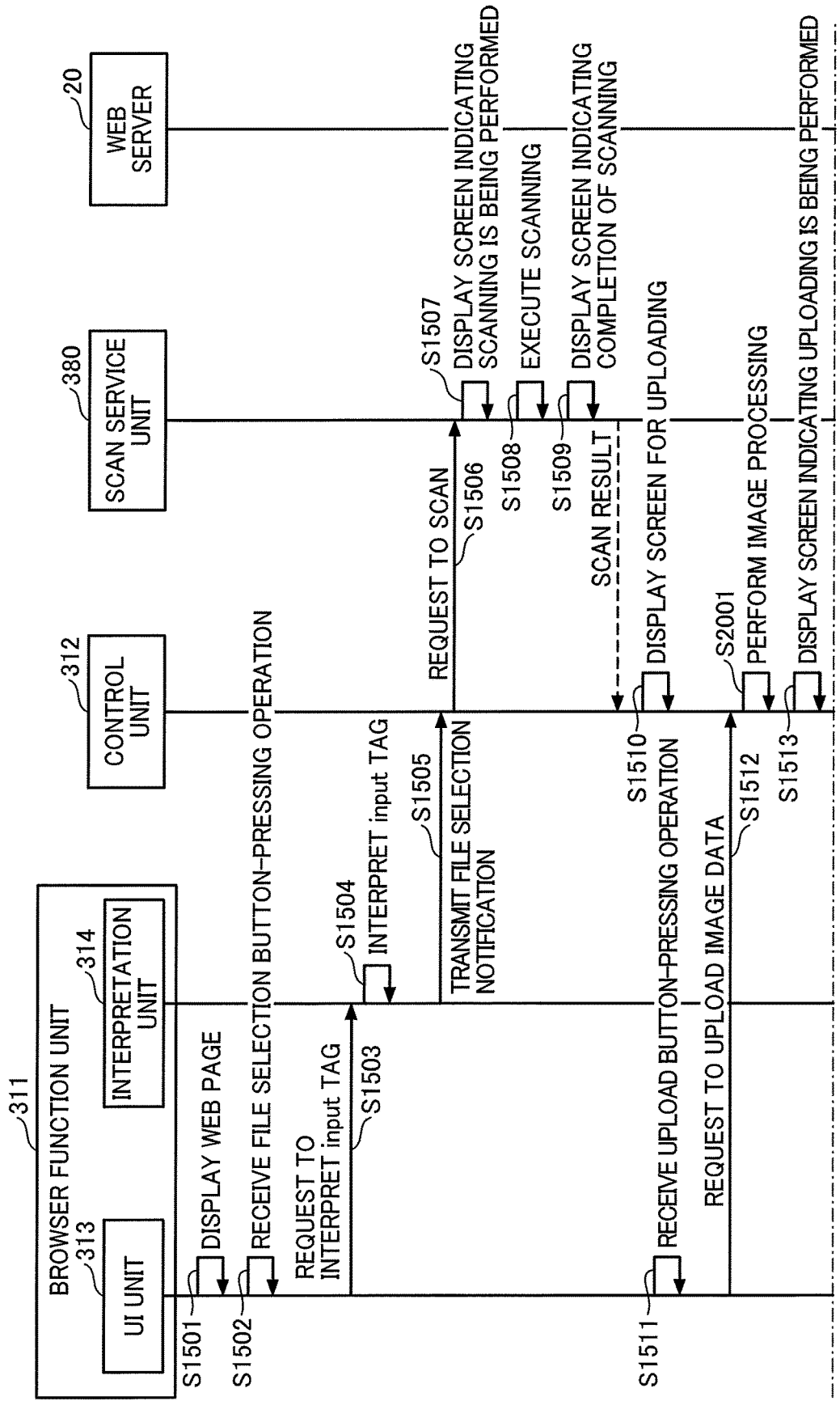

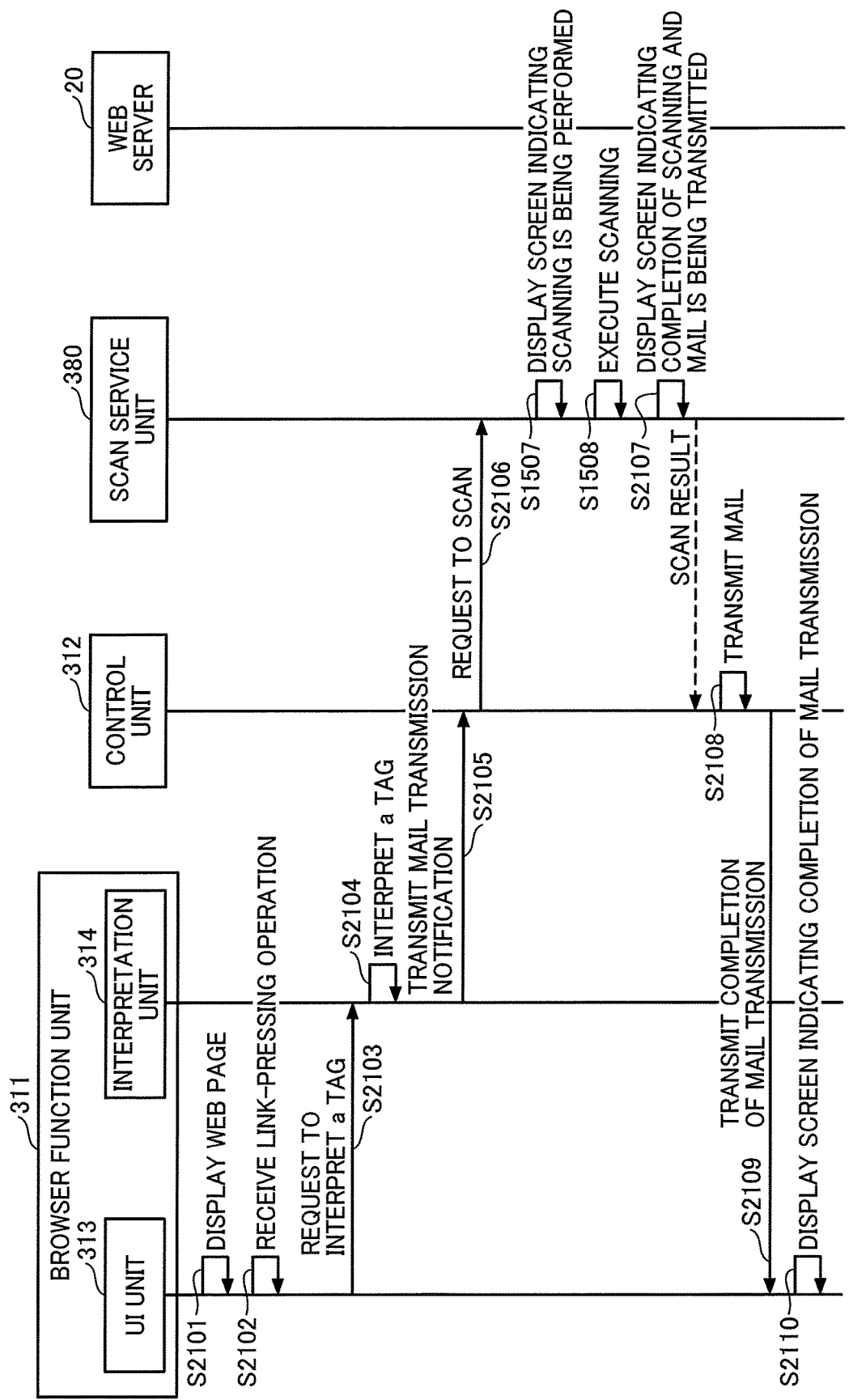

FIG. 23

```
<a href="mailto:user001@hogehoge.com">Destination1</a>
```

IMAGE PROCESSING APPARATUS, IMAGE PROCESSING SYSTEM, AND IMAGE PROCESSING METHOD FOR INTERPRETING CONTENT OBTAINED FROM A WEB BROWSER AND DISPLAYING A SCREEN BASED ON THE INTERPRETED CONTENT

CROSS-REFERENCE TO RELATED APPLICATION

This patent application is based on and claims priority pursuant to 35 U.S.C. § 119(a) to Japanese Patent Applications Nos. 2017-052276, filed on Mar. 17, 2017, 2017-151160, filed on Aug. 3, 2017, 2017-151827, filed on Aug. 4, 2017, and 2018-001503, filed on Jan. 9, 2018 in the Japan Patent Office, the entire disclosure of which are hereby incorporated by reference herein.

BACKGROUND

Technical Field

The present disclosure relates to an image processing apparatus, an image processing system, and an image processing method.

Related Art

A technique of performing various image processing functions such as printing and scanning using a web application operating on a web browser in an image processing apparatus such as multifunction peripheral (MFP) is known.

The image processing functions including printing and scanning are functions that are unique to the image processing apparatus, such as an MFP. To perform the image processing functions unique to the image processing apparatus, a web application is required to be described in Hyper Text Markup Language (HTML) using Java Script (registered trademark) developed for the image processing apparatus.

On the other hand, a web application that is used in an information processing apparatus, such as a smartphone, a tablet terminal, and a personal computer (PC) is described in general-purpose HTML. In the general-purpose HTML, an HTML tag that implements the function unique to the image processing apparatus, such as printing or scanning, is not prepared. Accordingly, it has been difficult to implement the image processing functions unique to the image processing apparatus, using the general-purpose HTML.

SUMMARY

Example embodiments of the present disclosure include image processing apparatus installed with a web browser that includes circuitry and an image processing device. The circuitry interprets content obtained from a web server connected to the image processing apparatus via a network, displays a screen based on the interpreted content, requests the web server to process according to a user input on the displayed screen, and requests the image processing device to perform predetermined image processing.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein:

FIG. 6 (FIGS. 6A and 6B) is a sequence diagram illustrating an example of a printing process according to the embodiment;

FIG. 8 is an illustration of an example of an a tag;

FIG. 9 is an illustration of a Hypertext Preprocessor (PHP) code;

FIG. 15 (FIGS. 15A and 15B) is a sequence diagram illustrating an example of a scanning process according to the embodiment;

FIG. 17 is an illustration of an input tag;

FIG. 21 is a sequence diagram illustrating still another example of the scanning process (variation 3) according to the embodiment;

FIG. 23 is an illustration of another example of an a tag;

Figure 1:
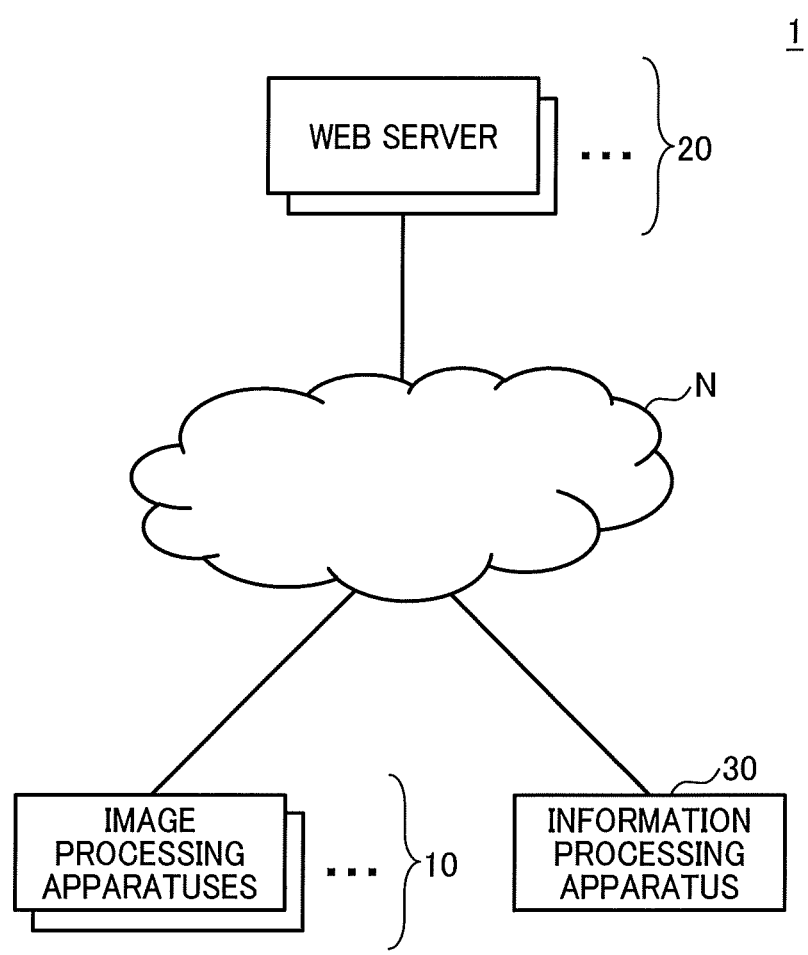
FIG. 1 is a schematic view illustrating an example configuration of an image processing system according to an embodiment.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A description is given of several embodiments of the present disclosure with reference to the drawings.

<Overview of System Configuration>

A description is given of an overview of a configuration of an image processing system 1 according to one of the embodiments of the present disclosure with reference to FIG. 1. FIG. 1 is a schematic view illustrating an example configuration of the image processing system 1 according to the present embodiment.

As illustrated in FIG. 1, the image processing system 1 according to the present embodiment includes one or more image processing apparatuses 10 (collectively referred to as the image processing apparatus 10), one or more web servers 20 (collectively referred to as the web server 20), and an information processing apparatus 30. The image processing apparatus 10 and the web server 20 are communicably connected to each other via a wide area network N such as the Internet.

The image processing apparatus 10 is an electronic apparatus such as a multifunction peripheral (MFP) that is installed with a web browser. A user of the image processing apparatus 10 uses a web application provided from the web server 20 to print out electric data that is downloaded from the web server 20 and to upload image data generated by scanning to the web server 20, for example.

The web server 20 is a computer or a computer system that provides a web application using general-purpose Hyper Text Markup Language (HTML) via the network N. In this disclosure, the general-purpose HTML includes HTML 5 and HTML 5.1 that are defined in the world wide web consortium (W3C). The "general-purpose" HTML is content that is interpretable and processable with a general-purpose web browser that runs on any type of apparatus. That is, the "general-purpose" HTML is different from content (e.g., extended content such as extended HTML and extended Java Script interpretable and processable with a specific type of apparatus, such as an image processing apparatus. The general-purpose HTML is usable in a personal terminal including, for example, a personal computer, a portable device, and a smartphone, and is commonly used in general-purpose web servers and web applications.

Various web services are realized by the web applications provided by the web server 20. Such web services include, for example, a cloud storage service, a social networking service (SNS), a cloud printing service, a blog service, a bulletin board service, an online game service, and an online shopping service.

Examples of the information processing apparatus 30 includes a personal computer (PC), a smartphone, and a tablet terminal, each of which is installed with a web browser.

The illustration of FIG. 1 is one example of the configuration of the image processing system 1. In some of the embodiments, the image processing apparatus 10 is a digital camera, a printer, a scanner, a copier, a projector, a facsimile, a videoconference terminal, or an electronic whiteboard, for example. That is, the image processing apparatus 10 is replaceable with any other electronic apparatus that performs at least one of input and output of data in relation to the web server 20. Additionally, in some of the embodiments, the image processing system 1 may not include the information processing apparatus 30.

<Hardware Configuration of Image Processing Apparatus 10>

Figure 2:
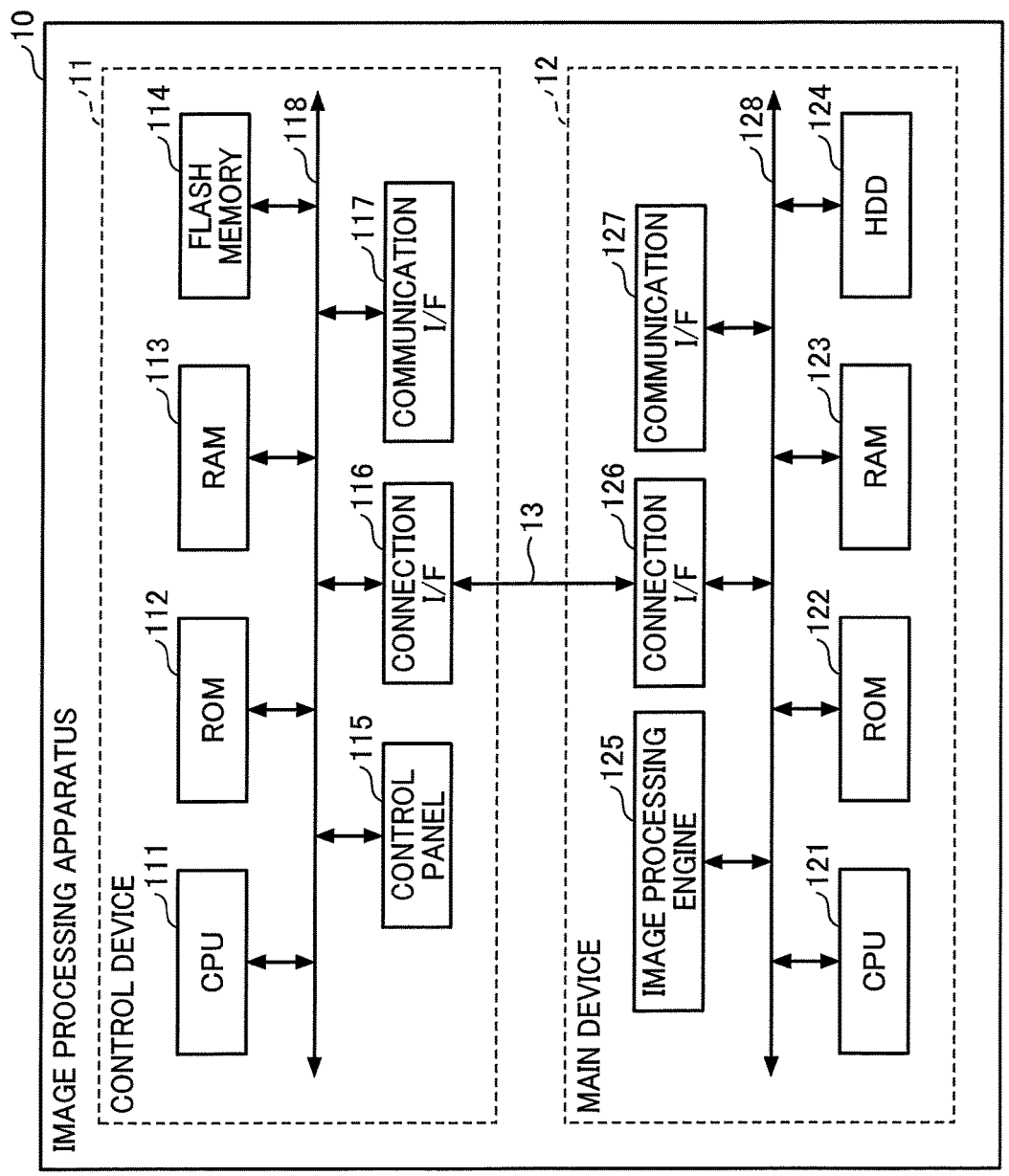
FIG. 2 is a diagram illustrating an example of a hardware configuration of an image processing apparatus according to the embodiment.

A description is given of a hardware configuration of the image processing apparatus 10 according to the present embodiment with reference to FIG. 2. FIG. 2 is a diagram illustrating an example of the hardware configuration of the image processing apparatus 10.

As illustrated in FIG. 2, the image processing apparatus 10 according to the present embodiment includes a control device 11 and a main device 12.

The control device 11 is used for selecting an image processing function to be performed by the main device 12, inputting various setting values for performing the image processing function, inputting an instruction to start performing the image processing function, and/or switching a display screen, according to user operation, for example.

The main device 12 performs each image processing function according to the user operation with the control device 11.

As illustrated in FIG. 2, the control device 11 of the image processing apparatus 10 includes a central processing unit (CPU) 111, a read only memory (ROM) 112, and a random access memory (RAM) 113. The control device 11 further includes a flash memory 114, a control panel 115, a connection interface (I/F) 116, and a communication I/F 117. The above-mentioned hardware components in the control device 11 are connected to each other through a bus 118.

The CPU 111 executes various programs stored in the ROM 112 or the flash memory 114 using the RAM 113 as a work area to control overall operation of the control device 11.

The ROM 112 is a nonvolatile semiconductor memory (storage device) capable of storing programs and data to keep the stored programs and data even after the power is turned off. The RAM 113 is a volatile semiconductor memory (storage device) that temporarily stores programs and data.

The flash memory 114 is a nonvolatile storage device that stores various types of programs, such as a program for implementing the present embodiment, to be executed by the CPU 111 and various types of data.

The control panel 115 is used by the user for the various types of operation. Additionally, the control panel 115 displays various types of screens to the user.

The connection I/F 116 is an interface for allowing the control device 11 to communicate with the main device 12 through a communication path 13. As one example of the connection I/F 116, a universal serial bus (USB) standard interface is used.

The communication I/F 117 is an interface for communicating with other apparatuses. As one example of the communication I/F 117, a wireless local area network (LAN) using a wireless fidelity (Wi-Fi) standard is used.

Similarly, the main device 12 of the image processing apparatus 10 includes a CPU 121, a ROM 122, and a RAM 123. The main device 12 further includes a hard disk drive (HDD) 124, an image processing engine (image processing device) 125, a connection I/F 126, and a communication I/F 127. The above-mentioned hardware components in the main device 12 are connected to each other through a bus 128.

The CPU 121 executes a program stored in the ROM 122 or the HDD 124 using the RAM 123 as a work area to control overall operation of the main device 12.

The ROM 122 is a nonvolatile semiconductor memory (storage device) capable of storing programs and data to keep the stored programs and data even after the power is turned off. The RAM 123 is a volatile semiconductor memory (storage device) that temporarily stores programs and data.

The HDD 124 is a nonvolatile storage device and stores various types of programs, such as a program for implementing the present embodiment, to be executed by the CPU 121 and various types of data.

The image processing engine (image processing device) 125 is hardware that perform image processing, namely performs various image processing functions including a print function, a scanner function, a copy function, and a facsimile communication function.

The image processing engine 125 includes, for example, a plotter that prints an image on a sheet, a scanner that scans an image of a document into image data, and a facsimile communication device that carries out facsimile communication. In some of the embodiments, the image processing engine 125 may also include a finisher that sorts printed sheets and an automatic document feeding device (ADF) that automatically feeds the document.

The connection I/F 126 is an interface to communicate with the control device 11 through the communication path 13. As one example of the connection I/F 126, a universal serial bus (USB) standard interface is used.

The communication I/F 127 is an interface for communicating with other apparatuses. As one example of the communication I/F 127, a wireless local area network (LAN) using a wireless fidelity (Wi-Fi) standard is used.

The image processing apparatus 10 according to the present embodiment implements various processes as described later with the hardware configuration as illustrated in FIG. 2.

In FIG. 2, the image processing apparatus 10 includes the control device 11, but the embodiments are not limited to this. For example, in some of the embodiments, an information processing terminal such as a tablet terminal, a smartphone, a portable mobile phone, or a personal digital assistant (PDA) serves as a control device of the image processing apparatus 10. That is, the information processing terminal, in some of the embodiments, controls the image processing apparatus 10 by communicating with the image processing apparatus 10 via the communication I/F 117 of the control device 11 or the communication IN 127 of the main device 12.

<Layer Structure of Software of Image Processing Apparatus 10>

Figure 3:
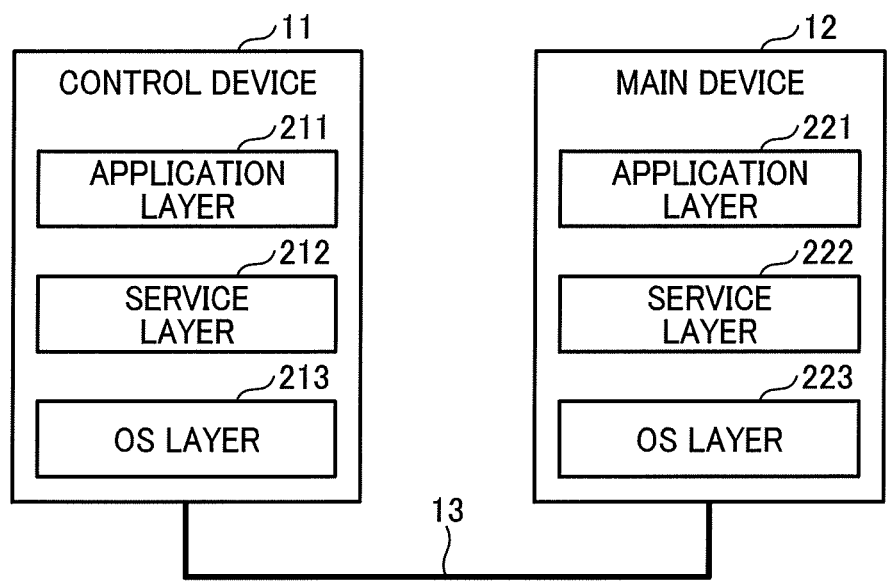
FIG. 3 is a diagram illustrating an example of a layer structures of a software groups each of which is included one of a control device and a main device of the image processing apparatus according to the embodiment.

A description is given of a layer structure of a group of software that is installed onto the control device 11 and the main device 12 of the image processing apparatus 10 according to the present embodiment with reference to FIG. 3. FIG. 3 is a diagram illustrating an example of the layer structures each of which is corresponding to the group of software that is installed onto one of the control device 11 and the main device 12 of the image processing apparatus 10 according to the present embodiment.

The layer structure of the software installed onto the main device 12, namely the group of programs stored in the ROM 122 and the HDD 124 of the main device 12, is described below. The software included in the main device 12 is classified into an application layer 221, a service layer 222, and an operating system (OS) layer 223.

Software classified as the application layer 221 implements the image processing function by causing a hardware resource to operate the image processing function. More specifically, the software classified as the application layer 221 includes, for example, a print application, a scan application, a copy application, and a facsimile (FAX) application.

Software classified as the service layer 222 intervenes between the application layer 221 and the OS layer 223. The software of the service layer 222 serves as an interface that enables the software of the application layer 221 to use the hardware resource included in the main device 12 and reports a state of the hardware resource included in the main device 12.

More specifically, the software of the service layer 222 receives an execution request for the hardware resource and allocates the received execution request. The execution request received by the service layer 222 is an execution request for image processing to be performed by the image processing engine 125 (a scan execution request to scan by a scanner, a print execution request to print by a plotter, etc.).

The interface function described above of the software of the service layer 222 applies to the application layer 211 of the control device 11. That is, software classified as the application layer 211 of the control device 11 also implements the image processing function by accessing the service layer 222 to cause the hardware resource of the main device 12 to operate to perform the image processing function.

Software classified as the OS layer 223 is basic software (OS) for providing a basic function to control the hardware resource of the main device 12. The software classified as the OS layer 223 receives the exaction request for the hardware resource from the software classified as the application layer 221 via the software classified as the service layer 222 and performs processing corresponding to the execution request.

The layer structure of the software group included in the control device 11, namely the program group stored in the ROM 112 and the flash memory 114 of the control device 11, is described below. The software group included in the control device 11 is also classified into the application layer 211, a service layer 212, and an operating system layer 213.

However, a function provided by the software classified as the application layer 211 and a type of the execution request acceptable with the service layer 212 are different from those of the the main device 12. The software classified as the application layer 211 of the control device 11 mainly provides a user interface function for various types of operation and displaying.

In the present embodiment, the OS of each of the control device 11 and the main device 12 operates independently.

Additionally, the OS of the control device 11 may be different from the OS of the main device 12, as long as the control device 11 and the main device 12 is communicable with each other. For example, the control device 11 uses Android (registered trademark) as an OS while the main device 12 uses Linux (registered trademark) as an OS.

As described above, in the image processing apparatus 10 according to the present embodiment, the control device 11 is controlled with the OS that is different from the OS of the main device 12. Accordingly, a communication between the control device 11 and the main device 12 is not regarded as an inter-process communication in a shared apparatus, but as communication between two different information processing apparatuses.

However, the image processing apparatus 10 is not limited to the above-described case where the OS of the control device 11 and the OS of the main device 12 are different from each other. In some of the embodiments, the same type of OS may operate in both of the control device 11 and the main device 12. Additionally, the image processing apparatus 10 is not limited to the above-described case where the OS of the control device 11 and the OS of the main device 12 operate individually and independently. In some of the embodiments, the control device 11 and the main device 12 may be incorporated into one device controlled by a single OS.

<Hardware Configuration of Information Processing Apparatus 30>

Figure 4:
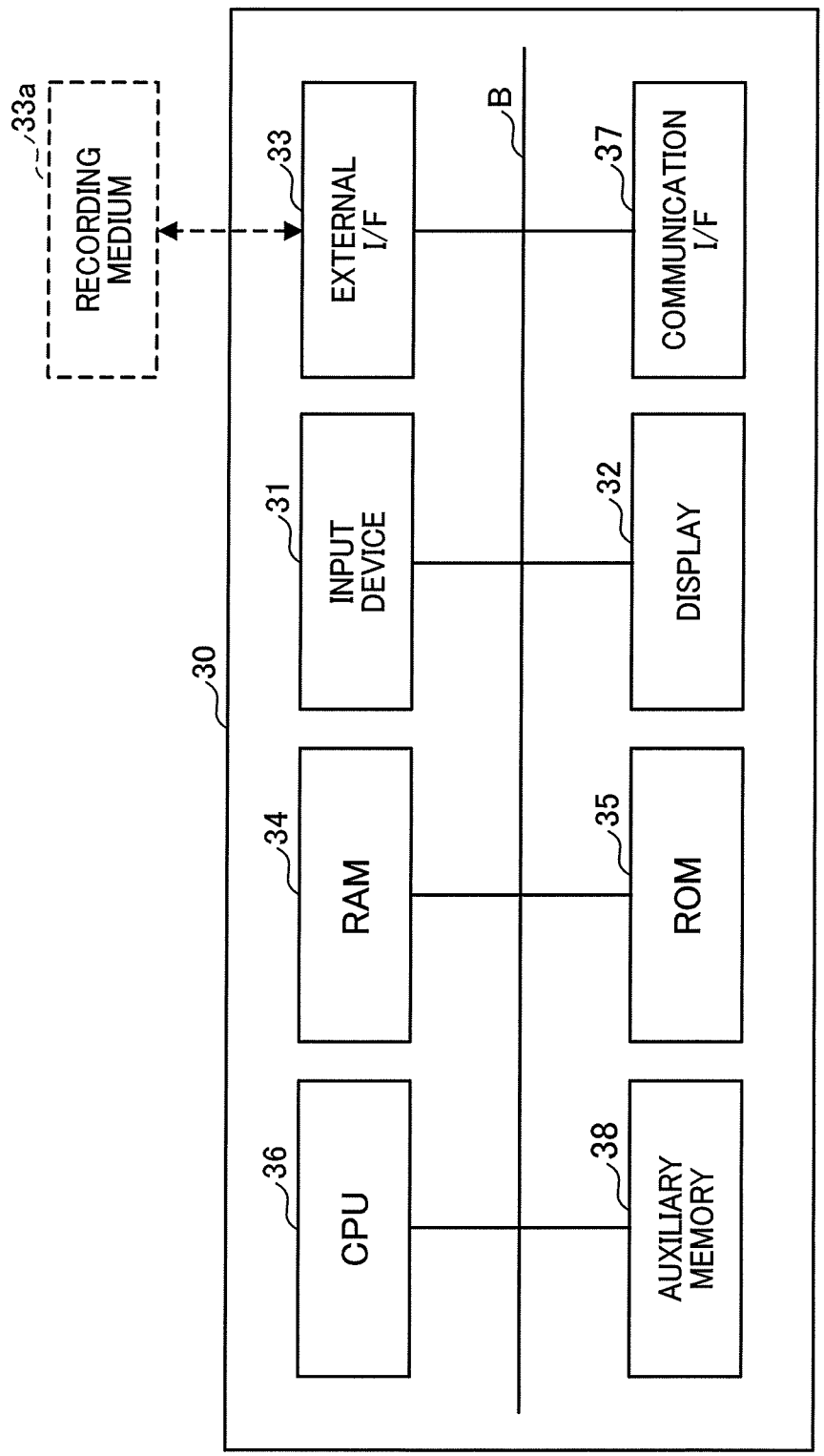
FIG. 4 is a diagram illustrating an example of a hardware configuration of an information processing apparatus according to the embodiment.

A description is given of a hardware configuration of the information processing apparatus 30 according to the present embodiment with reference to FIG. 4. FIG. 4 is a diagram illustrating an example of the hardware configuration of the information processing apparatus 30.

As illustrated in FIG. 4, the information processing apparatus 30 according to the present embodiment includes an input device 31, a display 32, an external I/F 33, a RAM 34, a ROM 35, a CPU 36, a communication I/F 37, and an auxiliary memory 38. The above-mentioned hardware components in the information processing apparatus 30 are connected to each other through a bus B.

The input device 31 includes a keyboard, a mouse, and/or a touch panel enabling a user to input various types of operation. The display 32 displays, for example, a processing result of the information processing apparatus 30.

The external I/F 33 is an interface with an external device. Examples of the external device include a recording medium 33a. The information processing apparatus 30 reads and writes data from and to the recording medium 33a via the external I/F 33.

Examples of the recording medium 33a includes a flexible disk, a Compact Disc (CD), a Digital Versatile Disk (DVD), a Secure Digital (SD) memory card, and a Universal Serial Bus (USB) memory.

The RAM 34 is a volatile semiconductor memory that temporarily stores programs and data. The ROM 35 is a nonvolatile semiconductor memory that holds programs and data even after the information processing apparatus 30 is turned off and the power is not supplied. The ROM 35 stores, for example, OS settings and network settings.

The CPU 36 reads a program and data from a memory such as the ROM 35 and the auxiliary memory 38 to the RAM 34 to execute processing.

The communication I/F 37 is an interface that connects the information processing apparatus 30 to the network N. The auxiliary memory 38 is a nonvolatile storage device that stores programs and data. Examples of the auxiliary memory 38 includes an HDD and a solid state disk (SSD). The programs and the data stored in the auxiliary memory 38 includes, for example, an Operating System (OS) and application programs that implements various types of functions on the OS.

<Software Configuration>

Figure 5:
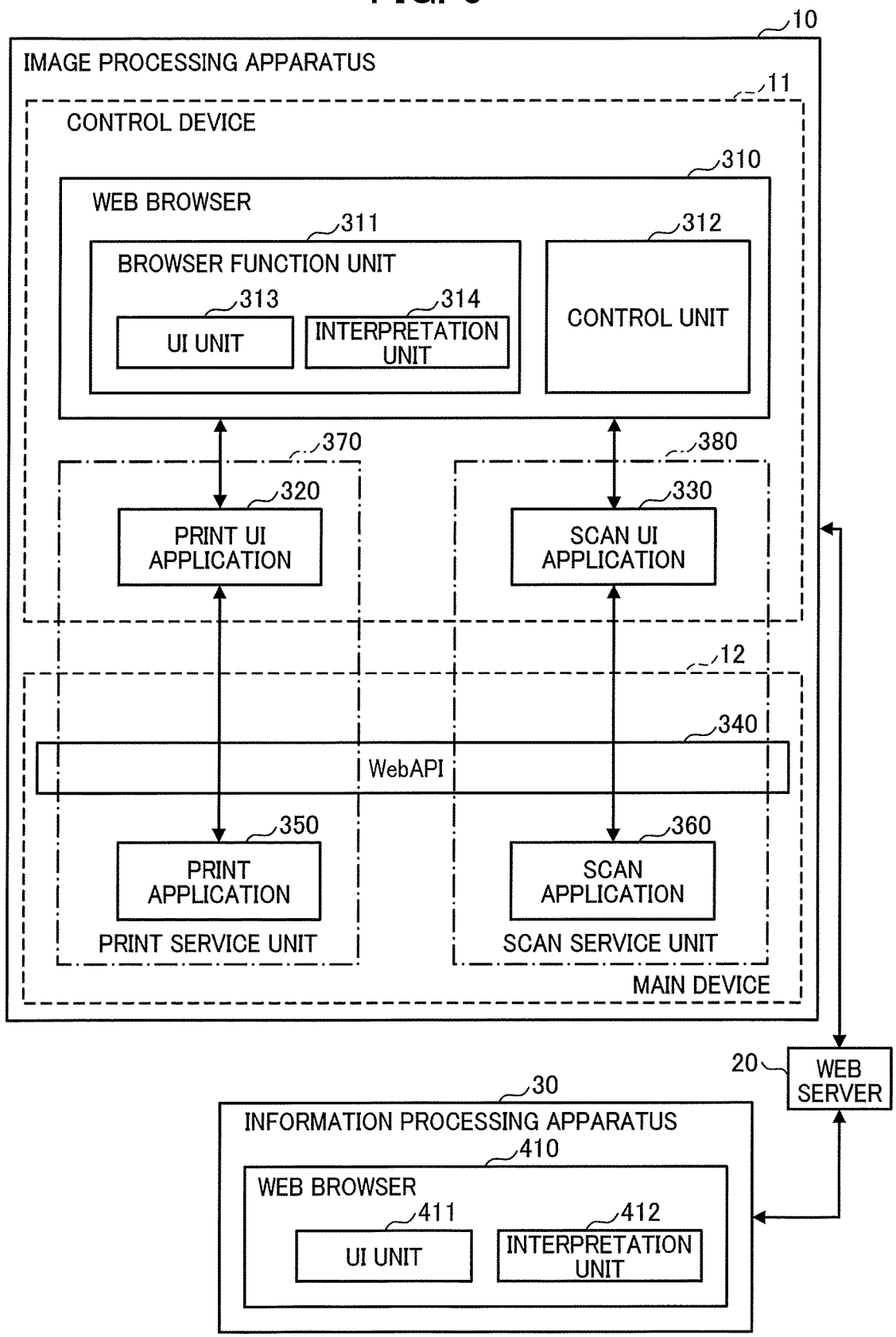
FIG. 5 is a diagram illustrating an example of the software configuration of the image processing system according to the embodiment.

A description is given of a software configuration of the image processing apparatus 10 and the information processing apparatus 30 included in the image processing system 1 according to the present embodiment with reference to FIG. 5. FIG. 5 is a diagram illustrating an example of the software configuration of the image processing system 1 according to the present embodiment.

[Image Processing Apparatus]

As illustrated in FIG. 5, the control device 11 of the image processing apparatus 10 according to the present embodiment includes a web browser 310, a print user interface (UI) application 320, and a scan UI application 330. Each of the web browser 310, the print UI application 320, and the scan UI application 330 is executed by the CPU 111.

The main device 12 of the image processing apparatus 10 according to the present embodiment includes a web application program interface (API) 340, a print application 350, and a scan application 360. Each of the web API 340, the print application 350, and the scan application 360 is executed by the CPU 121.

The web browser 310 acquires web content (e.g., HTML, cascading style sheets (CSC), Java Script, a type of electronic file) from the web server 20 to implement the web application.

For example, when the web server 20 provides a social networking service (SNS), the web browser 310 acquires web content from the web server 20 to implement the web application that enables a user to browse the SNS and share a file on the SNS. Additionally, when the web server 20 provides a cloud storage service, the web browser 310 acquires web content from the web server 20 to implement the web application that enables a user to browse a storage and upload a file to the storage, for example.

The web application is generally implemented in a manner that the content such as Java Script acquired from the web server 20 is operated on the web browser 310 in conjunction with the web server 20.

The web browser 310 includes a browser function unit 311 and a control unit 312. In the following description of the present embodiment, the web content is simply referred to as "content".

The browser function unit 311 interprets the content and displays the content, for example. The browser function unit 311 includes a UI unit 313 and an interpretation unit 314. When a link is pressed, or selected, on a web page displayed by the UI unit 313, the interpretation unit 314 interprets a HTML tag corresponding to the link and notifies the control unit 312 of an interpretation result.

The UI unit 313 displays the web page corresponding to the content acquired from the web server 20, for example. The UI unit 313 also receives various types of user operation (for example, link pressing) performed on the web page. The browser function unit 311 is implemented by using, for example, Web View.

In response to the notification from the interpretation unit 314 of the browser function unit 311, the control unit 312 causes the image processing apparatus 10 to perform each image processing function. For example, when receiving from the interpretation unit 314 a download notification, which indicates to download content of the link destination from the web server 20, the control unit 312 downloads the content and prints the content. Additionally, even when receiving a display notification, which indicates to display the content of the link destination from the interpretation unit 314, the control unit 312 downloads the content and prints the content if the content is in a predetermined format (for example, Joint Photographic Experts Group (JPEG) format).

The web browser 310 is a so-called hybrid application because the web browser 310 includes the browser function unit 311 for implementing the web application and the control unit 312 for controlling the image processing functions of the image processing apparatus 10. The web browser 310 is described in a programming language such as Java (registered trademark), for example. That is, a basic part of the browser application configuring the web browser 310 is configured with a Java application program. The Java application calls the browser function unit 311 (for example, Web View) of the control device 11 via the API provided by the control device 11, to configure the web browser 310 including the interpretation unit 314 and the UI unit 313. With the control unit 312 included in the Java application program, which is the basic part, flexibility in operation after interpreting the web content is archived, and the image processing operation including printing and scanning is also to be requested in addition to the operation with the general-purpose HTML, such as downloading and/or uploading.

The print UI application 320 is an application program that provides a UI (user interface) related to printing. The print UI application 320 displays, for example, a screen indicating that printing is being performed, and a screen indicating that printing is completed.

In response to a request from the control unit 312, the print UI application 320 requests the print application 350 to execute printing via the web API 340.

The scan UI application 330 is an application program that provides a UI related to scanning. The scan UI application 330 displays, for example, a screen indicating that scanning is being performed, and a screen indicating that scanning is completed.

In response to a request from the control unit 312, the scan UI application 330 requests the scan application 360 to perform scanning via the web API 340.

The web API 340 is an API (Application Programming Interface) for requesting for execution of the image processing with the print UI application 320 and the scan UI application 330.

In response to a request from the print UI application 320, the print application 350 causes the image processing engine 125 to perform printing.

In response to a request from the scan UI application 330, the scan application 360 causes the image processing engine 125 to perform scanning.

Hereinafter, the print UI application 320, the web API 340, and the print application 350 are collectively referred to as a "print service unit 370". Additionally, the scan UI application 330, the web API 340, and the scan application 360 are collectively referred to as a "scan service unit 380".

In some of the embodiments, the control device 11 includes, for example, an application providing a UI related to copying, an application providing a UI related to facsimile communication, and/or an application providing a UI related to optical character recognition (OCR). In some of the embodiments, the main device 12 includes, for example, an application for performing copying, an application for performing facsimile communication, and/or an application for performing OCR. The image processing apparatus 10, accordingly, may include various image processing service units, for example, a copy service unit, a facsimile communication service unit, and an OCR service unit.

Additionally, the image processing apparatus 10 includes, for example, an address book service unit that performs processing related to an address book held in the image processing apparatus 10 and an authentication service unit that perform authentication for the user to use the image processing apparatus 10.

[Information Processing Apparatus]

As illustrated in FIG. 5, the information processing apparatus 30 according to the present embodiment includes a web browser 410. The web browser 410 is executed by the CPU 36.

The web browser 410 includes a UI unit 411 and an interpretation unit 412. The UI unit 411 displays a web page corresponding to content acquired from the web server 20, for example. The UI unit 411 also receives various types of user operation (for example, link pressing) performed on the web page.

When a link is pressed, or selected, on the web page displayed by the UI unit 411, the interpretation unit 412 interprets a HTML tag corresponding to the link and notifies the UI unit 411 according to an interpretation result.

<Comparison Between Operation of Image Processing Apparatus 10 and Operation of Information Processing Apparatus 30>

The UI unit 411 of the web browser 410 installed in the information processing apparatus 30 accepts link pressing operation when the link pressing operation is performed by the user on the web page, for example. When a link is pressed, or selected, the interpretation unit 412 interprets a HTML tag (a tag (anchor tag)) corresponding to the link and notifies the UI unit 411 of an interpretation result, that is, the interpretation unit 412 transmits one of a display notification and a download notification, according to an interpretation result. For example, when a file specified by a "href" attribute in the a tag is a file that is able to be displayed on the web browser 410, (for example, the extension is html, img, pdf, etc.,) the display notification is transmitted. On the other hand, when the file specified by the "href" attribute in the a tag is a file that is not able to be displayed on the web browser 410, (for example, the extension is zip, etc.,) the download notification is transmitted. However, for example, when the extension specified by the "herf" attribute in the a tag is pdf, etc., which is able to be displayed on the web browser 410 and a "download" attribute is designated, the download notification is transmitted.

Then, when receiving the display notification, the UI unit 411 of the web browser 410 displays the file. On the other hand, when receiving the download notification, the UI unit 411 of the web browser 410 displays, for example, a screen for download (for example, a screen with which the user selects start or cancel of downloading).

The UI unit 313 of the web browser 310 installed in the image processing apparatus 10 accepts link pressing operation performed by the user on the web page, for example. When a link is pressed, or selected, the interpretation unit 314 interprets a HTML tag (a tag (anchor tag)) corresponding to the link and notifies the control unit 312, that is, transmits one of the display notification or the download notification, according to an interpretation result. Similarly to the information processing apparatus 30, for example, when a file specified by the "href" attribute in the a tag is a file that is able to be displayed on the web browser 310, (for example, the extension is html, img, pdf, etc.,) the display notification is transmitted. On the other hand, when the file specified by the "href" attributes in the a tag is a file that is not able to be displayed on the web browser 310, (for example, the extension is zip, etc.,) the download notification is transmitted.

When receiving the download notification, the control unit 312 determines whether the file to be downloaded is printable, and when the file is printable, the control unit 312 downloads the file and operates for printing the file. On the other hand, when receiving the display notification, the control unit 312 determines whether a file to be displayed is printable, and when the file is printable, the control unit 312 downloads the file and operates to print the file.

As described above, the web browser 310 installed in the image processing apparatus operates to print the file when the file interpreted, by the web browser 410 of the information processing apparatus 30, as the file to be downloaded or displayed, is printable. The image processing apparatus 10, accordingly, downloads and prints content by the web application with the general-purpose HTML.

Additionally, the UI unit 411 of the web browser 410 installed in the information processing apparatus 30 accepts file selection operation, for example, when a file is selected by the user on the web page. Subsequently, the interpretation unit 412 interprets a HTML tag (input tag) of a button to which the operation is performed and notifies the UI unit 411 of an interpretation result, namely transmits a file selection notification.

When receiving the file selection notification, the UI unit 411 of the web browser 410 uploads the selected file to a server that is designated, for example.

On the other hand, the UI unit 313 of the web browser 310 installed in the image processing apparatus 10 accepts the file selection operation, for example, when a file is selected by the user on the web page. Subsequently, the interpretation unit 314 interprets a HTML tag (input tag) of a button to which the operation is performed and notifies the control unit 312 of an interpretation result, namely transmits the file selection notification.

When receiving the file selection notification, the control unit 312 uploads the file generated by scanning to a server that is designated.

As described above, the web browser 310 installed in the image processing apparatus operates to generate the file that is interpreted as the file selected by the web browser 410 of the information processing apparatus 30, by scanning, and uploads the generated file. The image processing apparatus 10, accordingly, generates and downloads content by the web application with the general-purpose HTML.

<Operation>

A description is given in detail of operation of the image processing system 1 according to the present embodiment.

Embodiment 1

A process in which the image processing apparatus 10 installed with the web application of the general-purpose HTML downloads the content from the web server 20 and prints the content according to the user operation is described below with reference to FIG. 6 (FIGS. 6A and 6B). FIG. 6 (FIGS. 6A and 6B) is a sequence diagram illustrating an example of a printing process according to one of the embodiments (Embodiment 1).

Figure 7:
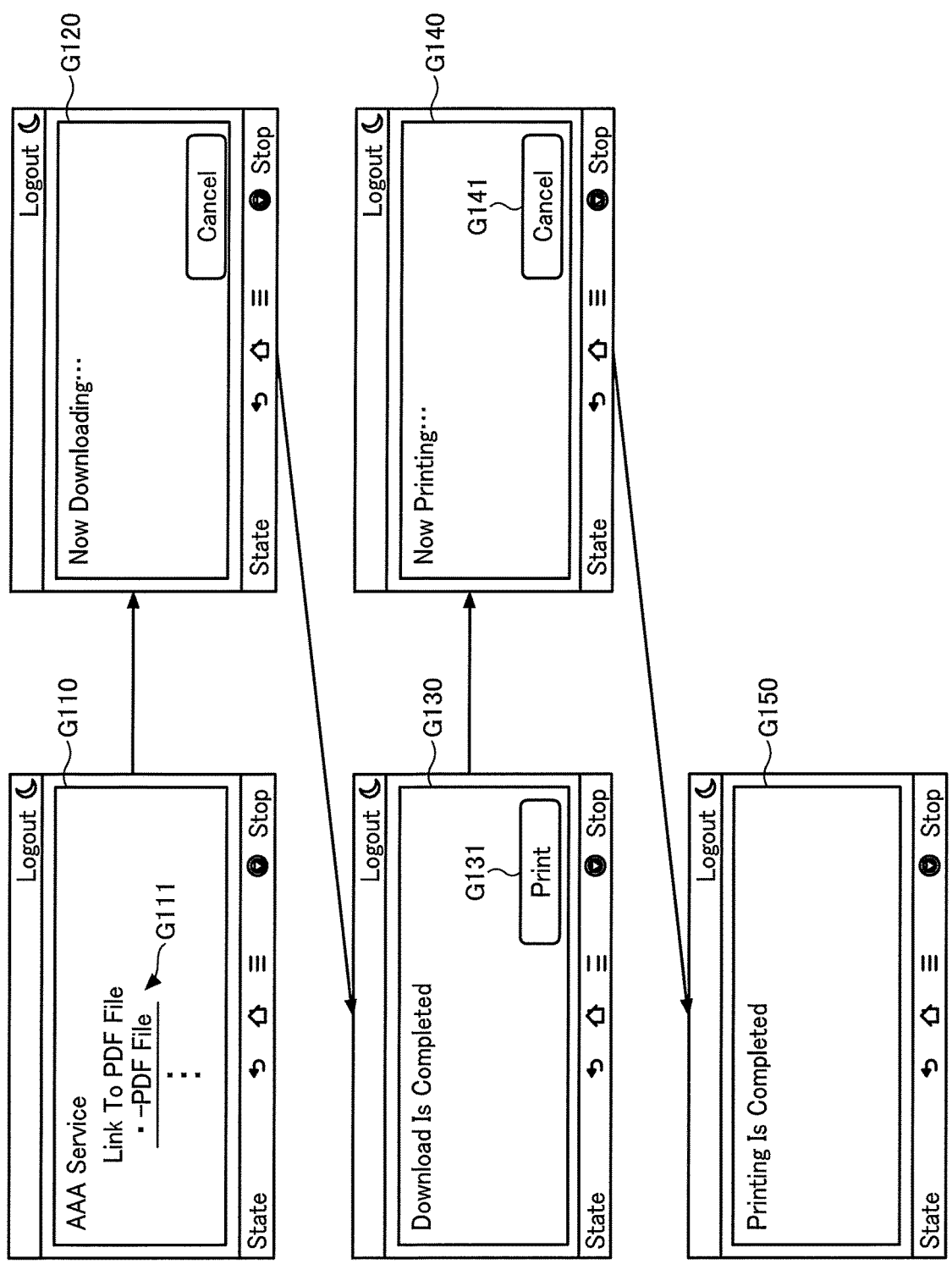
FIG. 7 is an illustration of an example transition of a screen in a printing process.

The UI unit 313 of the browser function unit 311 displays a web page G110 illustrated in FIG. 7 (S601). The web page G110 illustrated in FIG. 7 is displayed when the interpretation unit 314 interprets the content (HTML, Cascading Style Sheets (CSS), Java Script, etc.,) obtained from the web server 20. The content is obtained, for example, in response to a user operation to input a Uniform Resource Locator (URL) for displaying the web page G110, or press a link to the URL.

The web page G110 illustrated in FIG. 7 includes a link G111 to a Portable Document Format (PDF) file stored in the web server 20. The user is assumed to press the link G111.

The UI unit 313 of the browser function unit 311 receives the pressing operation performed on the link G111 by the user (S602). The link G111 included in the web page G110 illustrated in FIG. 7 is configured with an a tag (anchor tag) to which attributes, for example, "herf", "download", and "type" are set, as illustrated in FIG. 8. With the "href" attribute in the a tag illustrated in FIG. 8, a URL of a storage destination of the PDF file named "file. pdf" is specified by a relative path. In addition to settings of the attributes mentioned above, other various attributes may also be set in the a tag.

The UI unit 313 of the browser function unit 311 transmits to the interpretation unit 314, an interpretation request to interpret the a tag, which implements the link G111 pressed by the user (S603).

The interpretation unit 314 of the browser function unit 311 interprets the a tag, which implements the link G111 (S604). That is, by interpreting the a tag, the interpretation unit 314 determines whether the content of the link destination specified by the "href" attribute in the a tag is to be displayed on the web browser 310 or downloaded.

Whether the content is to be displayed on the web browser 310 or downloaded is determined with an extension of the content of the link destination specified by the "herf" attribute, for example. For example, when the extension is "html", "jpeg", or "gif", the content is determined to be displayed on the web browser 310. On the other hand, when the extension is "pdf", "doc", "xls", or "zip", the content is determined to be downloaded. Additionally, whether the content is to be displayed on the web browser 310 or downloaded is defined for each extension in a configuration file of the web browser 310, for example. More specifically, whether the content is to be displayed or downloaded is settable for each extension, for example, content of "jpeg" is a target to be downloaded.

When the content is determined to be downloaded in S604, the interpretation unit 314 of the browser function unit 311 transmits a download notification to the control unit 312 (S605). The interpretation unit 314 transmits the download notification by calling a download API, such as an "on Download Start", which is used to download content to an apparatus equipped with a browser. In using "on Download Start", the URL specified by the "href" attribute and a MIME type specified by the "type" attribute are used as parameters. "on Download Start" is one of the APIs (control unit API and control device API) provided in the control device 11.

The control unit 312 checks whether the content that is to be downloaded (the content of the link destination specified by the "href" attribute) is printable (S606).

Whether the content, which is to be downloaded, is printable or not is determined based on, for example, the MIME type specified by the "type" attribute or the extension of the content, for example. For example, when the MIME type specified by the "type" attribute is "application/pdf", "application/msword", or "application/msexcel", the content is printable. On the other hand, when the MIME type specified by the "type" attribute is "application/zip", etc., namely the content is compressed, the content is determined to be unable to print, for example. Additionally, when being encrypted for example, the content, which is to be downloaded, is determined to be unable to print.

However, in a case where the content is in a compressed format, the content may be downloaded and decompressed, and then checked whether the content is printable after the decompression. When the decompressed content is not able to print in such a case, an error screen may be displayed on the web browser 310, for example. The example case in which the content after the decompression is not printable is the case where the content is a video file (e.g., extension ". mp4" or an audio file (e.g., extension ".mp3").

The MIME type is designated as a parameter of "on Download Start", for example. Additionally, the extension of the content may be specified with the URL designated as the parameter of "on Download Start".

In the following description, the content, which is to be downloaded, is to be determined to be able to print in S606. In a case where the content, which is to be downloaded, is determined to be unable to print in S606, the control unit 312 transmits, for example, a download permission notification to the interpretation unit 314. With this operation, a dialog for selecting a storage destination is displayed for the user, and the browser function unit 311 downloads the content from the web server 20.

However, in the case where the content, which is to be downloaded, is determined to be unable to print because of the content is compressed or encrypted, the content may be decompressed or decrypted before performing determination whether the decompressed or decrypted content is able to print. The decompression or decryption may be performed by the control unit 312 or by requesting other server, for example. Furthermore, input of a password by the user may be performed before the decompression or decryption.

When the decompressed or decrypted content is printable, operation of S607 to S619, which are described below, is performed.

When the content is determined to be able to print, the control unit 312 transmits to the UI unit 313, a display request to display a downloading screen indicating that the download is being performed (S607).

In response to the display request to display the downloading screen, which indicates that downloading is being performed, the UI unit 313 of the browser function unit 311 displays the downloading screen, for example, a download screen G120 illustrated in FIG. 7 (S608). Displaying the downloading screen G120 illustrated in FIG. 7 informs the user that the content is being downloaded.

The control unit 312 transmits to the web server 20 a download request to download the content, which is to be downloaded, namely, the content of the link destination specified by the "href" attribute in the a tag (S609). The content, accordingly, is downloaded from the web server 20. The content downloaded from the web server 20 is stored in a storage area, which is directed in advance in the flash memory 114, for example.

Additionally, the control unit 312 may assign a user identification (ID) for identifying the user of the image processing apparatus 10 to the downloaded content, for example. Additionally, the control unit 312 may add information indicating print settings to the downloaded content, for example.

After downloading the content from the web server 20, the control unit 312 transmits to the UI unit 313 a display request to display a download completion screen (S610).

The UI unit 313 of the browser function unit 311 displays the download completion screen, i.e., a download completion screen G130 illustrated in FIG. 7, in response to the display request (S611). Displaying the download completion screen G130 illustrated in FIG. 7 informs the user that the download of the content is completed.

The download completion screen G130 illustrated in FIG. 7 includes a print execution button G131. By pressing the print execution button G131, the user requests to start printing the downloaded content. The following assumes that the user presses the print execution button G131

The UI unit 313 of the browser function unit 311 receives the pressing on the print execution button G131 by the user (S612). If the print execution button G131 is not pressed, or a cancel button G141, which is described later, is pressed, the downloaded content may be deleted or stored in the image processing apparatus 10.

The UI unit 313 of the browser function unit 311 transmits to the control unit 312 a print execution request to print the downloaded content (S613).

In response to the print execution request received from the browser function unit 311, the control unit 312 transmits the print execution request to the print service unit 370 (S614). The print execution request includes information indicating a storage destination of the content that is downloaded in S609 described above. The print execution request may also include, for example, information on predetermined print settings, such as information indicating default print settings or print settings determined by the control unit 312.

The control unit 312 is capable of calling the print UI application 320 of the print service unit 370 using an application linkage API such as "inten", which is for calling other application in an apparatus. "inten" is one of the APIs (control unit API, control device API) provided in the control device 11. With the called print UI application 320, print settings for performing the image processing functions, the print execution button, information indicating printing, information indicating print cancel, and the like may be displayed.

In response to the print execution request received from the control unit 312, the print service unit 370 displays a printing screen G140 illustrated in FIG. 7, for example (S615). The printing screen G140 illustrated in FIG. 7 is displayed by the print UT application 320. Displaying the printing screen G140 illustrated in FIG. 7 allows the user to know that the downloaded content is being printed.

Subsequently, the print service unit 370 executes printing of the content downloaded in S609 (S616). The execution of printing is performed by transmitting a printing request from the print UI application 320 to the print application 350 via the web API 340. The content downloaded from the web server 20 printed, accordingly.

The printing screen G140 illustrated in FIG. 7 includes a cancel button G141. When the cancel button G141 is pressed by the user, the print UI application 320 transmits a print cancel request to the print application 350 via the web API 340. With this operation, the printing of the downloaded content is canceled.

When the printing is completed, the print application 350 transmits to the print UI application 320, a print completion notification which is a response to the print request. On the other hand, for example, when an error occurs during the printing, the print application 350 transmits to the print UI application 320 an error notification indicating that the error has occurred. Upon receiving the error notification, the print UI application 320 displays a screen indicating that the error has occurred.

Subsequently, the print service unit 370 transmits to the control unit 312 a print completion notification when the printing is completed in S616 (S617). The print completion notification is transmitted by the print UI application 320.

Upon receiving the print completion notification from the print service unit 370, the control unit 312 transmits to the UI unit 313 the print completion notification (S618).

Upon receiving the print completion notification, the UI unit 313 of the browser function unit 311 displays, for example, a print completion screen G150 illustrated in FIG. 7 (S619). Displaying the print completion screen G150 illustrated in FIG. 7 allows the user to know that the contents has been printed.

The content of the link destination, which is determined to be the content that is to be downloaded in S604, is printed through the operation from S605 to 619 described above.

On the other hand, when the content is determined to be displayed on the web browser 310 in S604, the interpretation unit 314 of the browser function unit 311 transmits a display notification to the control unit 312 (S620). The interpretation unit 314 transmits the display notification by calling a display update API, such as "should Override Url Loading", which is used to update a screen being displayed with a UI of a browser. In using "should Override Url Loading", the URL specified by the "href" attribute is used as a parameter. "should Override Url Loading" is one of the APIs (control unit API and control device API) provided in the control device 11.

The control unit 312 checks whether the content to be displayed, namely the content of the link destination specified by the "href" attribute, is printable (S621).

Whether the content, which is to be displayed, is printable or not is determined with, for example, the extension of the content, for example. For example, when the extension is "jpg", "jpeg", or "tiff", the content is determined to be able to print. On the other hand, when the extension is, for example, "html" or "htm", the content is determined to be unable to print.

However, when the extension is, for example, "html" or "htm", the print execution button may be displayed along with the content on the web browser 310. By pressing the print execution button, the user prints the content (web page) displayed on the web browser 310.

The extension of the content is specified with the URL designated as the parameter of "should Override Url Loading", for example.

Whether the content, which is to be displayed, is printable or not may be determined with the MIME type specified by the "type" attribute. In this case, when the MIME type specified by the "type" attribute is, for example, "image/jpeg", "image/gif", or "image/png", the content is determined to be able to print. When the MIME type specified by the "type" attribute is, for example, "text/html", the content is determined to be unable to print.

In the following description, the content, which is to be displayed, is to be determined to be able to print in S621. In a case where the content, which is to be displayed, is determined to be unable to print in S621, the control unit 312 transmits, for example, a display permission notification to the interpretation unit 314. With this operation, the content is obtained from the web server 20 and displayed on the web browser 310 by the browser function unit 311.

When the content is determined to be able to print, the control unit 312 transmits a print execution notification to the interpretation unit 314 (S622). Then, the image processing apparatus 10 performs S607 to S619. When the content of the link destination of the link pressed by the user is to be displayed and image data of the content is in a JPEG format as described above, the content is printed.

As described above, the image processing apparatus 10 according to the present embodiment downloads and prints the content, according to a type of the content of the link destination, when the link that is configured with an a tag of the general-purpose HTML, is pressed by the user. The image processing apparatus 10 according to the present embodiment implements the printing function without using a dedicated HTML tag dedicated to the printing function.

This allows a developer of a web application provided by the web server 20 to develop the web application for implementing the image processing function specific to the image processing apparatus 10 without knowledge of dedicated Java Script, HTML, and/or the like, for example.

In some of the embodiments, the printing process described with reference to FIG. 6 is performed by Hypertext Preprocessor (PHP) instead of Java Script. For example, a PHP code as illustrated in FIG. 9 is to be generated and stored as a name of "dl.php" in the web server 20, and also defined as <a href="./dl.php">download</a> in the HTML received by the web browser 310, for example. With this configuration, "dl.php" is processed on the web server 20 and a HyperText Transfer Protocol (HTTP) header instructing download is transmitted from the web server 20 to the web browser 310, when a download link defined in the HTML is pressed by the user.

The HTTP header instructing the download in the case of the PHP code as illustrated in FIG. 9 includes "Content-Type:application/force-download" and "Content-disposition:attachment;filename="myfile.pdf"". With this configuration, the interpretation unit 314 of the web browser 310 determines that "myfile.pdf" is the content to be downloaded in S604.

Variation of Embodiment 1 (Variation 1)

Figure 10B:
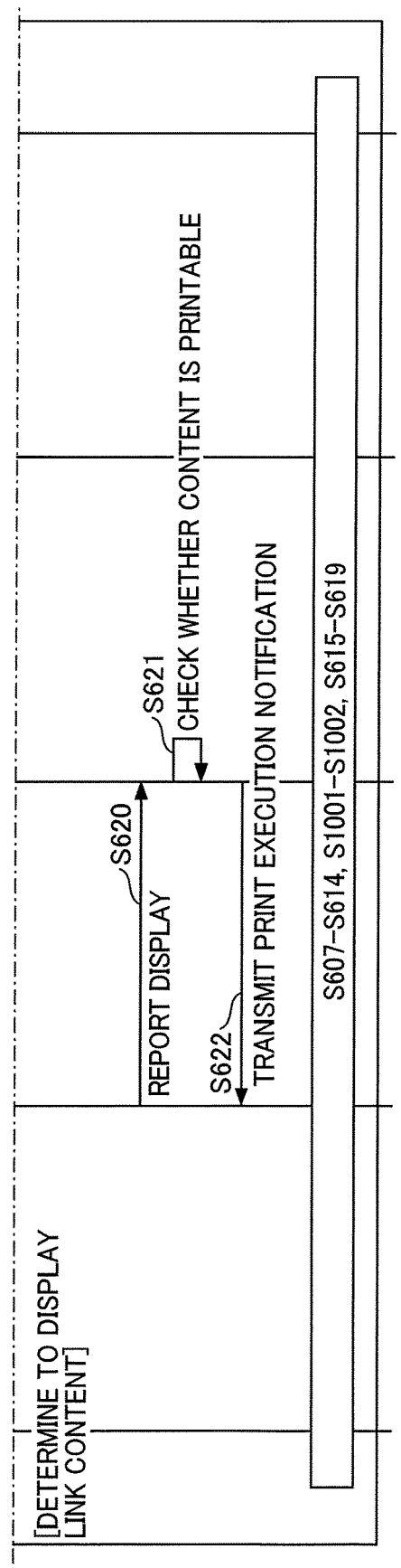
FIG. 10 (FIGS. 10A and 10B) is a sequence diagram illustrating another example of the printing process (variation 1) according the embodiment.

A description is given below of another example of the printing process (variation 1) with reference to FIG. 10 (FIGS. 10A and 10B). FIG. 10 (FIGS. 10A and 10B) is a sequence diagram illustrating another example of the printing process (variation 1) according to the embodiment. Operation of S601 to S614 and S615 to S622 of FIG. 10 is substantially the same as the operation of S601 to S622 of FIG. 6 and the explanation of the operation is omitted here.

Figure 11:
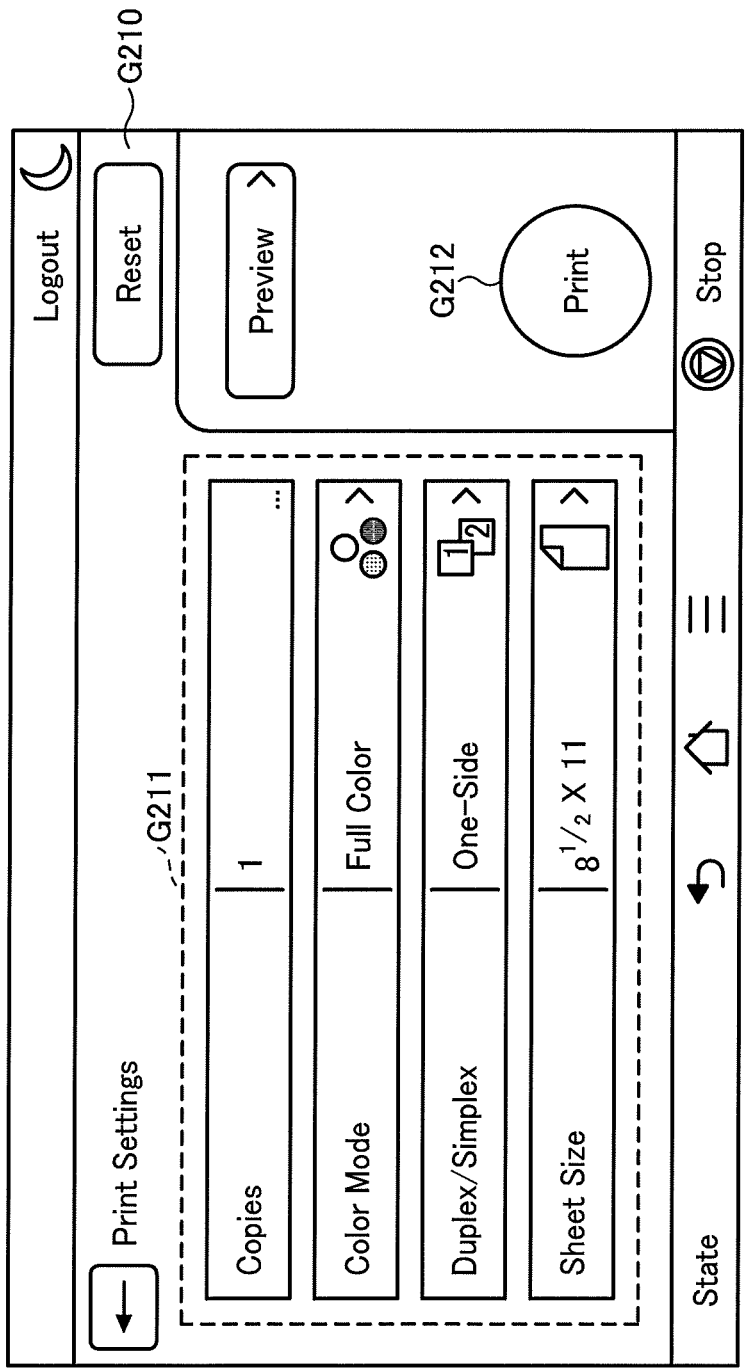
FIG. 11 is an illustration of a print setting screen.

Subsequent to S614, the print service unit 370 displays, for example, a print setting screen G210 as illustrated in FIG. 11 in response to the print execution request received from the browser function unit 311 (S1001). The print setting screen G210 illustrated in FIG. 11 is displayed by the print UI application 320.

The print setting screen G210 illustrated in FIG. 11 includes a print setting area G211 and a print execution button G212. According to user operation with the print setting area G211, various settings including "the number of copies", "color", "print-side", and "sheet size" are settable. The user is assumed to operate with the print setting area G211 to set the print settings, or to perform the print setting operation, and then press on the print execution button G212.

The print service unit 370 accepts the print setting operation by the user and pressing operation performed on the print execution button G212 (S1002). The print setting operation and pressing operation on the print execution button G212 performed by the user is received by the print UI application 320. The content is printed based on the print settings set by the user in S616.

Variation of Embodiment 1 (Variation 2)

A description is given below of still another example of the printing process (variation 2) with reference to FIG. 12

Figure 12B:
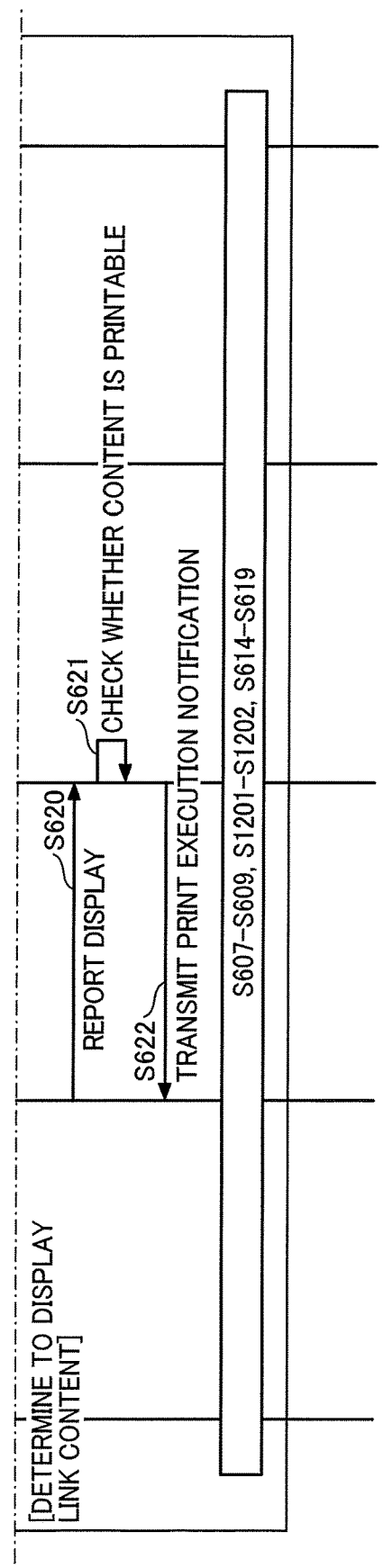
FIG. 12 (FIGS. 12A and 12B) is a sequence diagram illustrating still another example (variation 2) of the printing process according to the embodiment.

(FIGS. 12A and 12B). FIG. 12 (FIGS. 12A and 12B) is a sequence diagram illustrating still another example of the printing process (variation 2) according to the embodiment.

In the printing process illustrated in FIG. 12, the operation of S610 to S613 of FIG. 6 is not performed. That is, the content of the link destination is downloaded and printed without pressing the print execution button by the user, after the user presses the link configured with the a tag in the printing process illustrated in FIG. 12. This allows the user to print the content of the link destination simply, just pressing the link configured with the a tag.

Additionally, the control unit 312 transmits to the UI unit 313 a delete request to delete the downloading screen subsequent to S509 in the printing process illustrated in FIG. 12 (S1201). Upon receiving the delete request to delete the downloading screen, the UI unit 313 deletes the downloading screen G120 (S1202)

Variation of Embodiment 1 (Variation 3)

Figure 13B:
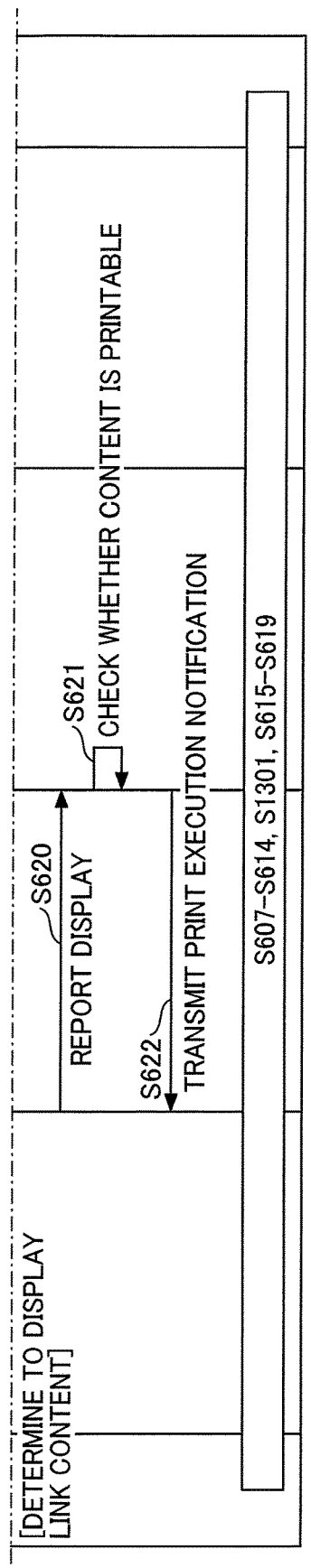
FIG. 13 (FIGS. 13A and 13B) is a sequence diagram illustrating still another example of the printing process (variation 3) according to the embodiment.

A description is given below of still another example of the printing process (variation 3) with reference to FIG. 13 (FIGS. 13A and 13B). FIG. 13 (FIGS. 13A and 13B) is a sequence diagram illustrating still another example of the printing process (variation 3) according to the embodiment. Operation of S601 to S614 and S615 to S622 of FIG. 13 is substantially the same as the operation of S601 to S622 of FIG. 6 and the explanation of the operation is omitted here.

Subsequent to S614, the print service unit 370 performs predetermined image processing on the content downloaded in S609 (S1301). The predetermined image processing performed by the print service unit 370 includes adding information such as a URL of the download destination and a time to the content, and converting a data format. In S616, the content on which the predetermined image processing is performed is printed.

Figure 14:
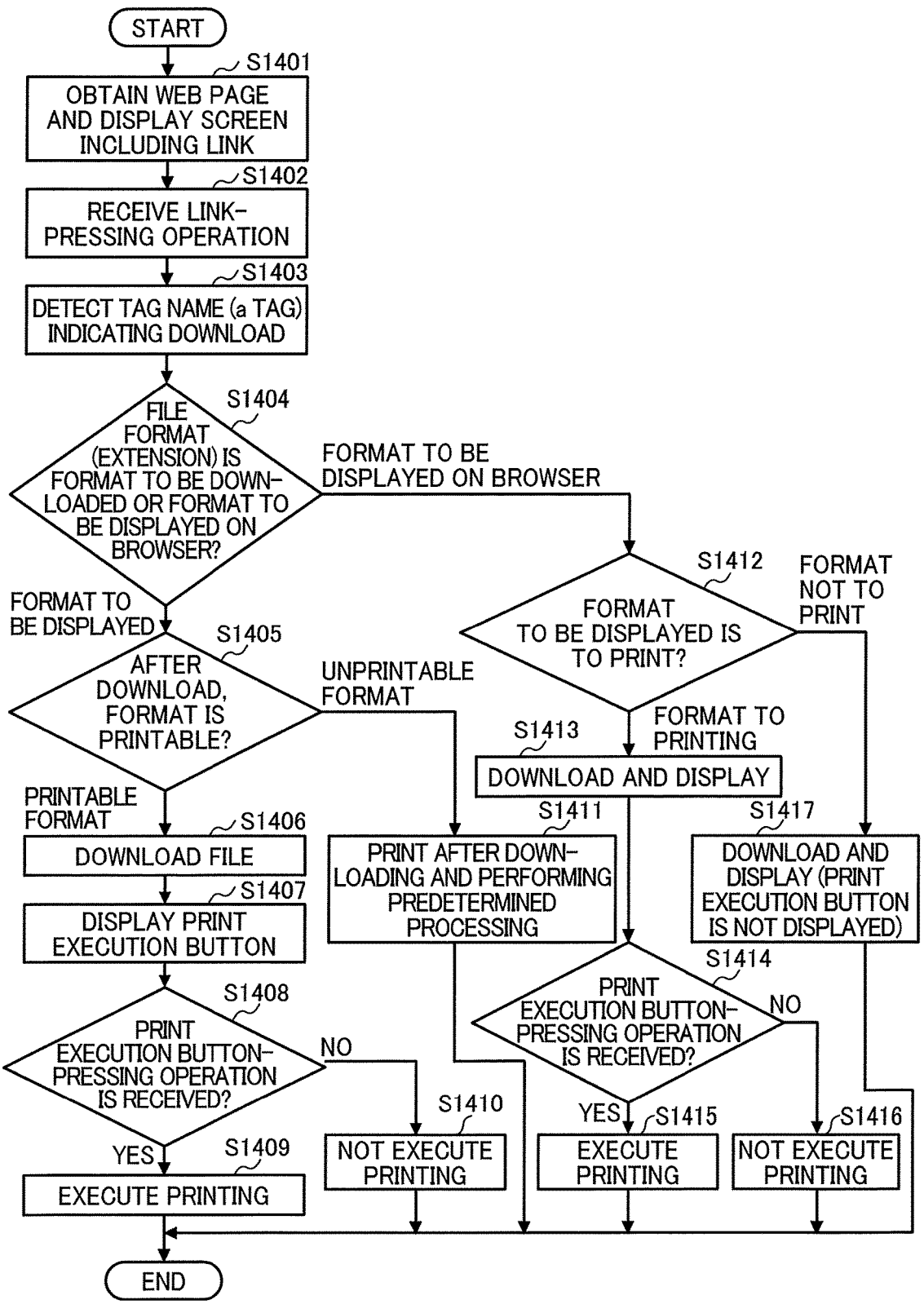
FIG. 14 is a flowchart illustrating operation of a web browser when the printing process is performed.

One example of the operation of the web browser 310 in performing the printing process is described with reference to FIG. 14. FIG. 14 is a flowchart illustrating the operation of the web browser 310 when the printing process is performed.

As described in FIG. 6, in particular S601, the web browser 310 obtains the content (web page) from the web server 20 and displays the screen including the link (S1401).

As described in FIG. 6, in particular S602, the web browser 310, subsequently, receives the link pressing operation performed by the user (S1402). When receiving the link pressing operation, the web browser 310 detects a predetermined tag (a tag) indicating download (S1403).

As described in FIG. 6, in particular S604, the web browser 310, subsequently, determines whether the file format (extension) of the content (file) of the link destination is a format to be downloaded or format to be displayed on the web browser 310 (S1404). For example, an extension of the format to be downloaded includes "PDF", "JPEG", "doc", "xls", "zip", "mp3", and "mp4". For example, an extension the format to be displayed on the web browser 310 includes "html", "gif", and "png".

When determining that the file format is a format to be downloaded in S1404, the web browser 310 determines whether the file format is a format that is printable after being downloaded, as described in FIG. 6, in particular S606 (S1405). For example, an extension of the format that is printable after being downloaded includes "PDF", "JPEG", "doc", and "xls". For example, an extension of the format that is unable to print after being downloaded includes "zip", "mp3", and "mp4".

When determining that the file format is a format that is able to be print after being downloaded, in S1405, the web browser 310 downloads the content (file), as described in FIG. 6, in particular S609 (S1406). The web browser 310 does not, namely, display the content at this time. In some of the embodiment, the web browser 310 displays the content using another application such as a view application, for example. In using such an application, for example the view application, the content may be displayed after the print execution button is pressed in S1408, which is described later.

Subsequently, the web browser 310 displays a screen including the print execution button (e.g., download completion screen) as described in FIG. 6, in particular S611 (S1407).

The web browser 310, then, determines whether the pressing on the print execution button, which is included in the screen displayed in S1407, is received (S1408). In some of the embodiments, the print execution button is displayed on the print setting screen for setting the print settings and the web browser 310 receives the pressing on the print execution button displayed on the print setting screen.

When determining that the pressing on the print execution button is received in S1408, the web browser 310 executes printing of the content, as described in FIG. 6, in particular S613 (S1409).

In contrast, when determining that the pressing on the print execution button is not received (e.g., in a case where the printing is canceled) in S1408, the web browser 310 does not execute the printing of the content (S1410). In this case, the web browser 310 deletes the content. In some of the embodiments, the web browser 310 displays an error screen, when determining that the pressing on the print execution button is not received, but not the case where the printing is cancelled in S1408.

When determining that the file format is a format that is unable to print after being downloaded S1405, the web browser 310 downloads the content and performs a predetermine processing on the content to be printed (S1411). For example, the predetermined processing includes decompressing the content (file) and printing the content after the decompression, when the extension is "zip". When the format after the decompression is a format that is unable to print, for example, the extension of the compressed file is "mp3" or "mp4", the web browser 310 does not execute the printing of the content.

When determining that the file format is a format that is to be displayed on the web browser 310 in S1404, the web browser 310 determines whether the file format is to print (S1412). For example, an extension of the format to print includes "pif", and "png". For example, an extension of the format that is not to print includes "html".

When determining that the file format is a format that is printable in S1412, the web browser 310 downloads and displays the content (file) (S1413). At this time, the web browser 310 also displays the print execution button, which is for printing the content being displayed, on the screen.

Subsequently, the web browser 310 determines whether the pressing on the print execution button included in the screen displayed in S1413 is received (S1414). In some of the embodiments, the print execution button is displayed on the print setting screen for setting the print settings and the web browser 310 receives the pressing on the print execution button displayed on the print setting screen.

When determining that the pressing on the print execution button is received in S1414, the web browser 310 executes the printing of the content (S1415).

When determining that the pressing on the print execution button is not received in S1414, the web browser 310 does not executes the printing of the content (S1416). In this case, the web browser 310 deletes the content. In some of the embodiments, the web browser 310 displays an error screen, when determining that the pressing on the print execution button is not received, but not the case where the printing is cancelled.

When determining that the file format is a format that is unable to print in S1412, the web browser 310 downloads and displays the content (file) (S1417). In S1417, the web browser 310 does not display the print execution button for printing the content being displayed, which is different from S1413.

Embodiment 2

A process in which the image processing apparatus 10 installed with the web application of the general-purpose HTML uploads image data generated by scanning to the web server 20 is described below with reference to FIG. 15 (FIGS. 15A and 15B). FIG. 15 (FIGS. 15A and 15B) is a sequence diagram illustrating an example of a scanning process according to one of the embodiments (Embodiment 2).

Figure 16:
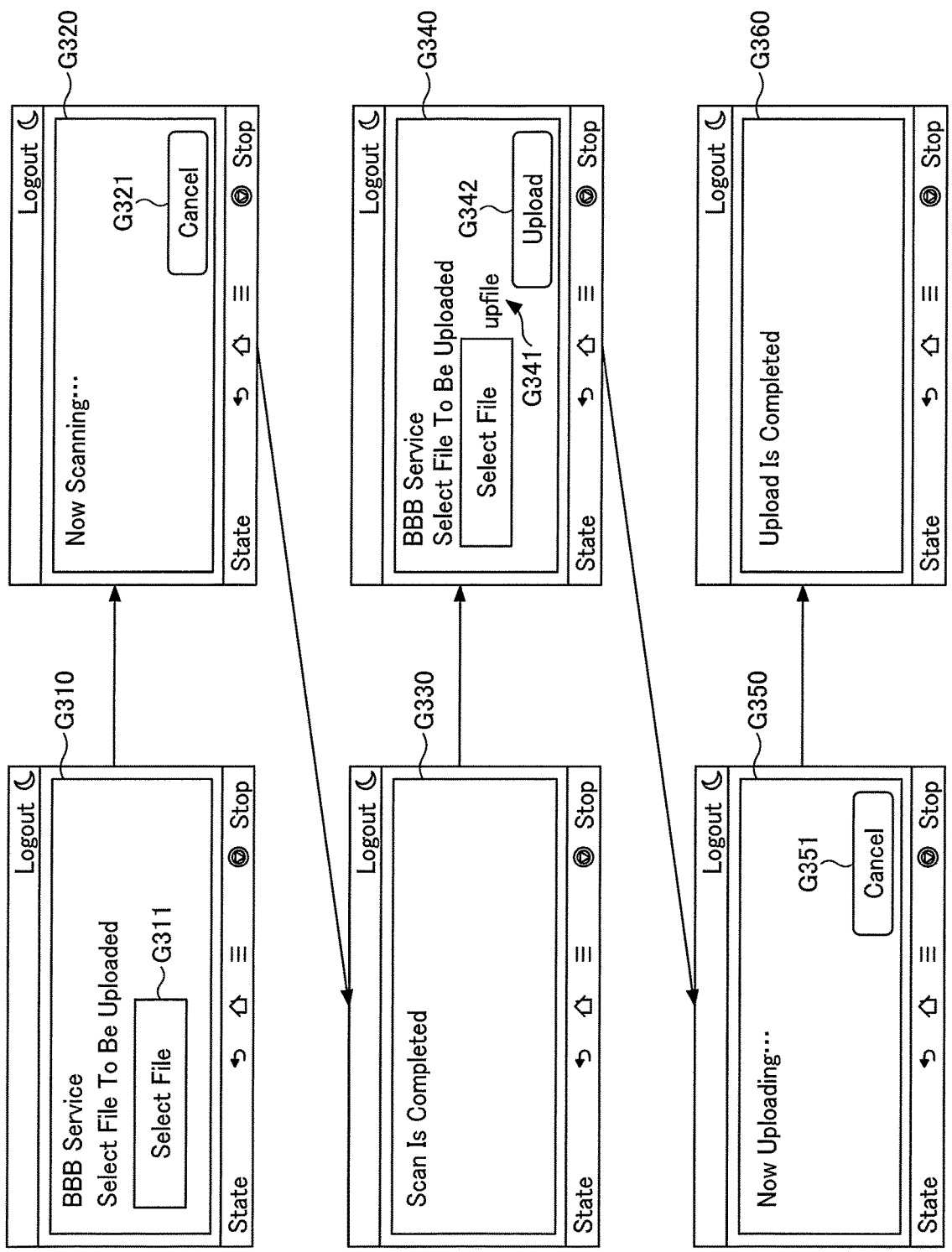
FIG. 16 is an illustration of an example of screen transition in the scanning process.

The UI unit 313 of the browser function unit 311 displays a web page G310 illustrated in FIG. 16 (S1501). The web page G310 illustrated in FIG. 16 is displayed when the interpretation unit 314 interprets content (HTML, CSS, Java Script, etc.,) obtained from the web server 20. The contents is obtained by, for example, inputting a URL for displaying the web page G110, or pressing a link to the URL.

The web page G310 illustrated in FIG. 16 includes a selection button G311 to select a file to be uploaded to the web server 20. The user is assumed to press the selection button G311. It is also assumed that a document to be scan is set to the scanner of the image processing apparatus 10.

The UI unit 313 of the browser function unit 311 receives the pressing on the selection button G311 by the user (S1502). The selection button G311 included in the web page G310 illustrated in FIG. 16 is configured with an input tag in which a "type" attribute, a "name" attribute, an "accept" attribute and a "capture" attribute are set, as illustrated in FIG. 17, for example. In addition to settings of the attributes mentioned above, other various attributes may also be set in the input tag.

The UI unit 313 of the browser function unit 311 transmits to the interpretation unit 314 an interpretation request to interpret the input tag, which implements the selection button G311 pressed by the user (S1503).

The interpretation unit 314 of the browser function unit 311 interprets the input tag, which implements the selection button G311 (S1504). That is, the interpretation unit 314 specifies a file selection by interpreting the input tag, from "file" specified by the "type" attribute in the input tag.

The interpretation unit 314 of the browser function unit 311, subsequently, transmits a file selection notification to the control unit 312 (S1505). The interpretation unit 314 transmits the file selection notification by calling a file selection API, such as "open File Chooser", which is used to select a file from the files stored in an apparatus. In using "open File Chooser", a call back destination for responding, a value specified by the "accept" attribute, and a value designated URL specified by the "capture" attribute are used as parameters. "open File Chooser" is one of the APIs (control unit API and control device API) provided in the control device 11.

Upon receiving to the file selection notification, the control unit 312 transmits a scan execution request to the scan service unit 380 (S1506). The control unit 312 is capable of calling the scan UI application 330 of the scan service unit 380 using intent, for example.

In response to the print execution request received from the control unit 312, the scan service unit 380 displays a scanning screen indicating scan is being performed, for example, a scanning screen G320 illustrated in FIG. 16 (S1507). The scanning screen G320 illustrated in FIG. 16 is displayed by the scan UI application 330. Displaying the scanning screen G320 illustrated in FIG. 16 allows the user to know that the document is being scanned.

The scan service unit 380, subsequently, executes the scanning of the document being set to the scanner and generates image data (S1508). The execution of the scanning is performed by transmitting a scan request from the scan UI application 330 to the scan application 360 via the web API 340. The image data, accordingly, is generated from the document set to the scanner. The image data generated by scanning is to be stored in a storage area directed in advance in the flash memory 114, for example.

The scanning screen G320 illustrated in FIG. 16 includes a cancel button G321. When the cancel button G321 is pressed by the user, the scan UI application 330 transmits a print cancel request to the scan application 360 via the web API 340. With this operation, the scanning of the document is cancelled.

When the scanning is completed, the scan application 360 responses for the scan UI application 330, which is a source of the scan request. On the other hand, for example, when an error occurs during the scanning, the scan application 360 transmits to the scan UI application 330 an error notification indicating that the error has occurred. Upon receiving the error notification, the scan UI application 330 displays a screen indicating that the error has occurred.

When the scanning executed in S1208 is completed, the scan service unit 380 displays, for example, a scan completion screen G330 illustrated in FIG. 16 (S1509). The scan service unit 380 also transmits to the control unit 312, a scan result (e.g., image data generated by scanning or information indicating a storage destination of the image data).

Upon receiving the scan result, the control unit 312 displays, for example, an upload screen G340 illustrated in FIG. 16 (S1510). The upload screen G340 illustrated in FIG. 16 displays a file name G341 of the image data generated by scanning. The upload screen G340 illustrated in FIG. 16 also includes an upload button G342. The user is assumed to press the upload button G342.

The UI unit 313 of the browser function unit 311 receives the pressing on the upload button G342 by the user (S1511). In some of the embodiment, the upload button G342 is included in another window such as a pop-up window displayed by the control unit 312. When the upload button G342 is not pressed, the image data generated by scanning may be stored in the image processing apparatus 10 or deleted without being stored.

The UI unit 313 of the browser function unit 311 transmits to the control unit 312 an upload request to upload the image data generated by scanning, when the upload button G342 is pressed by the user (S1512).

In response to the upload request to upload the image data, the control unit 312 displays, for example, an uploading screen G350 illustrated in FIG. 16, indicating that the uploading is being performed (S1513).

The control unit 312, subsequently, transmits to the web server 20, the upload request to upload the imaged data (S1514). The control unit 312, then, receives an upload result from the web server 20. The image data generated by scanning is uploaded on the web server 20, accordingly.

Additionally, the uploading screen G350 illustrated in FIG. 16 includes a cancel button G351. When the cancel button G351 is pressed by the user, the control unit 312 stops uploading the image data.

In some of the embodiments, the control unit 312 assigns to the image data generated by scanning, a user ID for identifying the user, before transmitting the upload request in S1214. Furthermore, in some of the embodiments, the control unit 312 adds to the image data generated by scanning, information indicating settings in scanning (e.g., size enlargement/reduction rate, trimming width, image correction value, information on an apparatus used for scanning).

Upon receiving the upload result from the web server 20, the control unit 312 transmits an upload completion notification to the UI unit 313 (S1515).

Upon receiving the upload completion notification, the UI unit 313 of the browser function unit 311 displays, for example, an upload completion screen G360 illustrated in FIG. 16 (S1516). Displaying the upload completion screen G360 illustrated in FIG. 16 allows the user to know that the scan of the document and the upload of the image data generated by scanning is completed.

As described above, the image processing apparatus 10 according to the present embodiment generates the image data by reading the document with the scanner and uploads the image data to the web server 20, when the button that is configured with the input tag of the general-purpose HTML is pressed by the user. The image processing apparatus 10 according to the present embodiment implements the scanning function without using a dedicated HTML tag dedicated to the scanning function.

This allows a developer of a web application provided with the web server 20 to develop the web application for implementing the image processing function specific to the image processing apparatus 10 without knowledge of dedicated Java Script, HTML, and/or the like, for example.

Variation of Embodiment 2 (Variation 1)

Figure 18B:
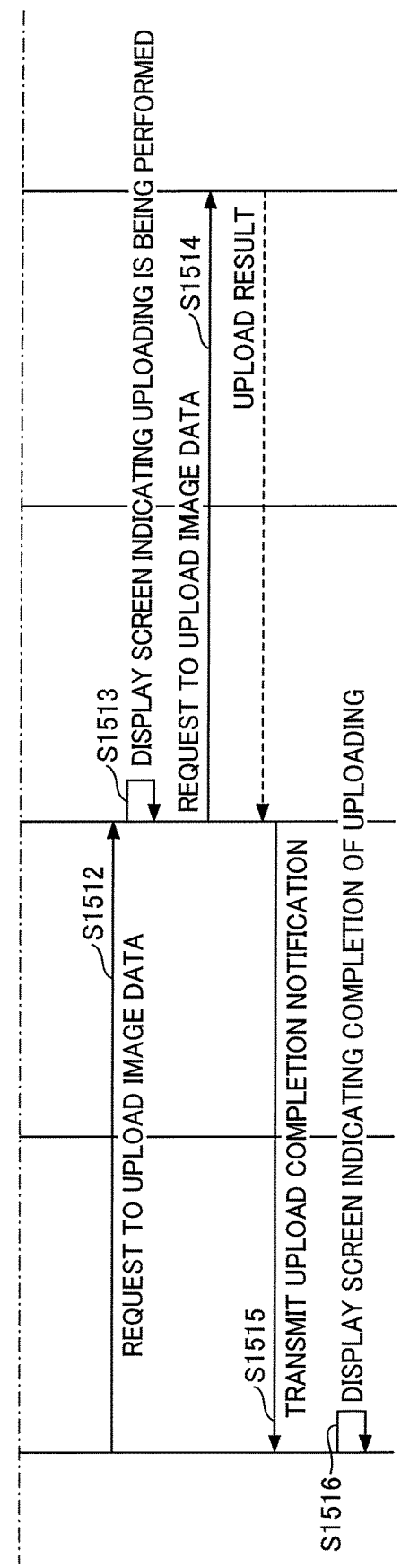
FIG. 18 (FIGS. 18A and 18B) is a sequence diagram illustrating still another example of the scanning process (variation 1) according to the embodiment.

A description is given below of another example of the scanning process (variation 1) with reference to FIG. 18 (FIGS. 18A and 18B). FIG. 18 (FIGS. 18A and 18B) is a sequence diagram illustrating an example of the scanning process (variation 1) according to the embodiment. Operation of S1501 to S1506 and S1507 to S1516 of FIG. 18 (FIGS. 18A and 18B) is substantially the same as the operation of S1501 to S1516 of FIG. 15 (FIGS. 15A and 15B) and the explanation of the operation is omitted here.

Figure 19:
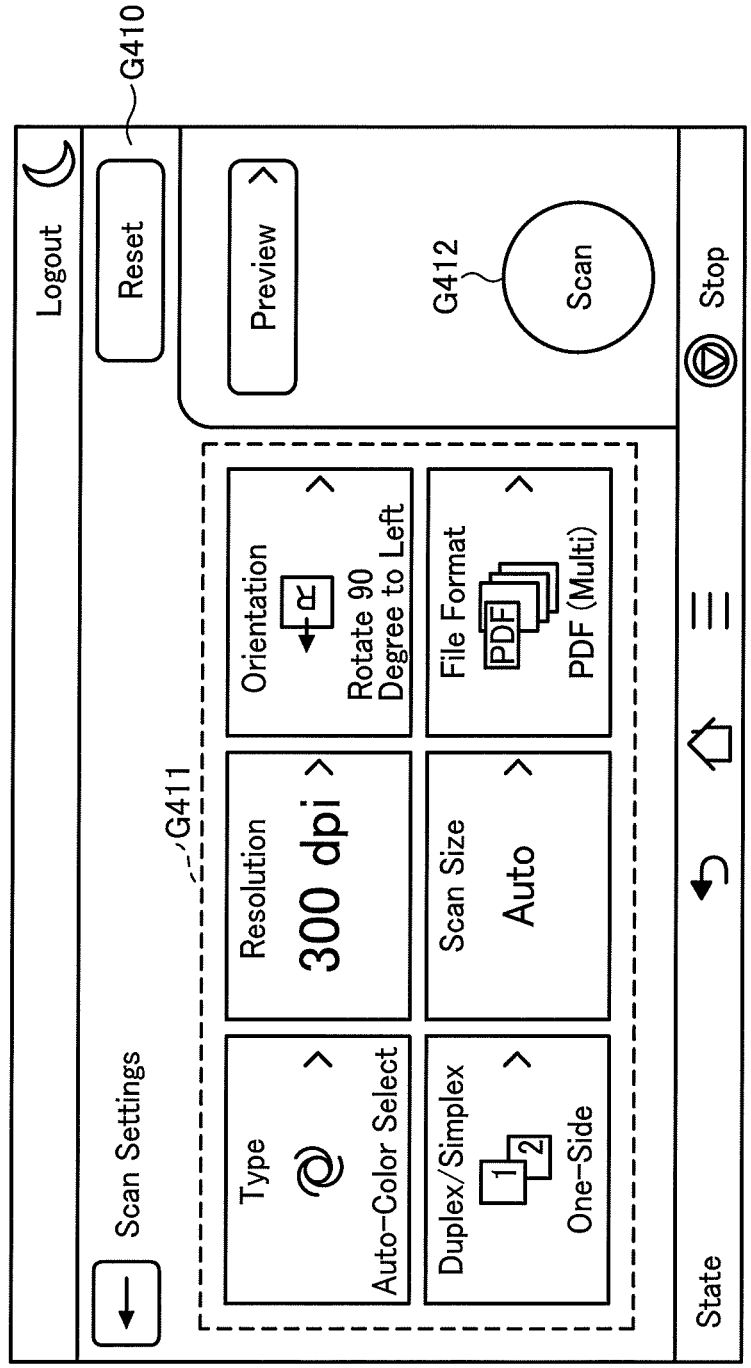
FIG. 19 is an illustration of a scan setting screen.

Subsequent to S1506, the scan service unit 380 displays, for example, a scan setting screen G410 illustrated in FIG. 19 in response to the scan execution request received from the browser function unit 311 (S1801). The scan setting screen G410 illustrated in FIG. 19 is displayed by the scan UI application 330.

The scan setting screen G410 illustrated in FIG. 19 includes a scan setting area G411 and a scan execution button G412. According to user operation with the scan setting area G411, various settings including "document type", "resolution", "document orientation", "scan size" and "file format" are settable. The user is assumed to operate with the scan setting area G411 to set the scan settings, or to perform the scan setting operation, and then press on the scan execution button G412.

The scan service unit 380 accepts the scan setting operation and pressing on the scan execution button G412 performed by the user (S1802). The scan setting operation and the pressing on the scan execution button G412 performed by the user is received by the scan UI application 330. The document is scanned based on the scan settings set by the user in S1508.

Variation of Embodiment 2 (Variation 2)

Figure 20B:
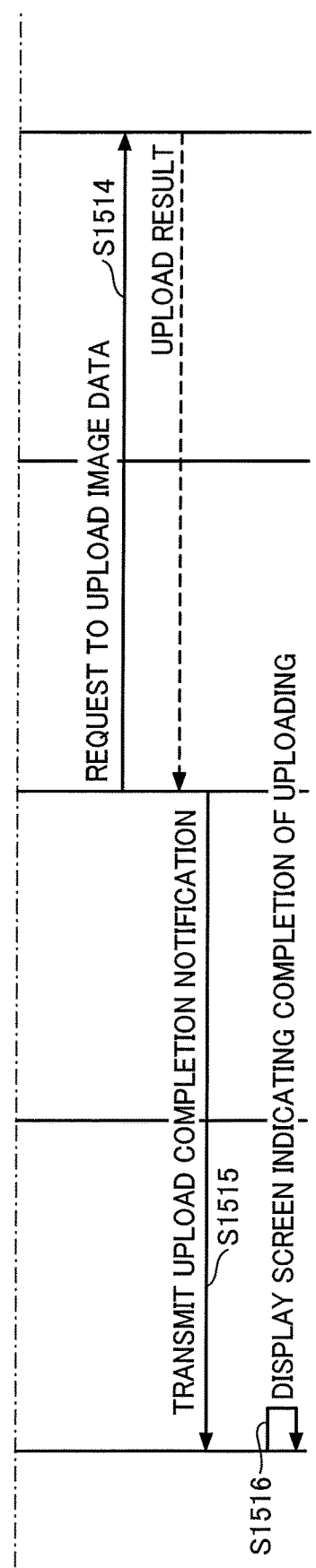
FIG. 20 (FIGS. 20A and 20B) is a sequence diagram illustrating still another example of the scanning process (variation 2) according to the embodiment.

A description is given below of still another example of the scanning process (variation 2) with reference to FIG. 20 (FIGS. 20A and 20B). FIG. 20 (FIGS. 20A and 20B) is a sequence diagram illustrating still another example of the scanning process (variation 2) according to the embodiment. Operation of S1501 to S1512 and S1513 to S1516 of FIG. 20 (FIGS. 20A and 20B) is substantially the same as the operation of S1501 to S1512 of FIG. 15 (FIGS. 15A and 15B) and the explanation of the operation is omitted here.

Subsequent to S1512, the control unit 312 performs predetermined image processing on the image data generated by scanning in response to the upload request to upload the image data (S2001). The predetermined image processing performed by the control unit 312 includes adding predetermined information, such as a URL of storage destination of the image data and a time to store the image data, to the image data. The image data on which the image processing performed is uploaded to the web server 20 in S1514.

Variation of Embodiment 2 (Variation 3)

A description is given below of still another example of the scanning process (variation 3) with reference to FIG. 21. FIG. 21 is a sequence diagram illustrating still another example of the scanning process (variation 3) according to the embodiment.

Figure 22:
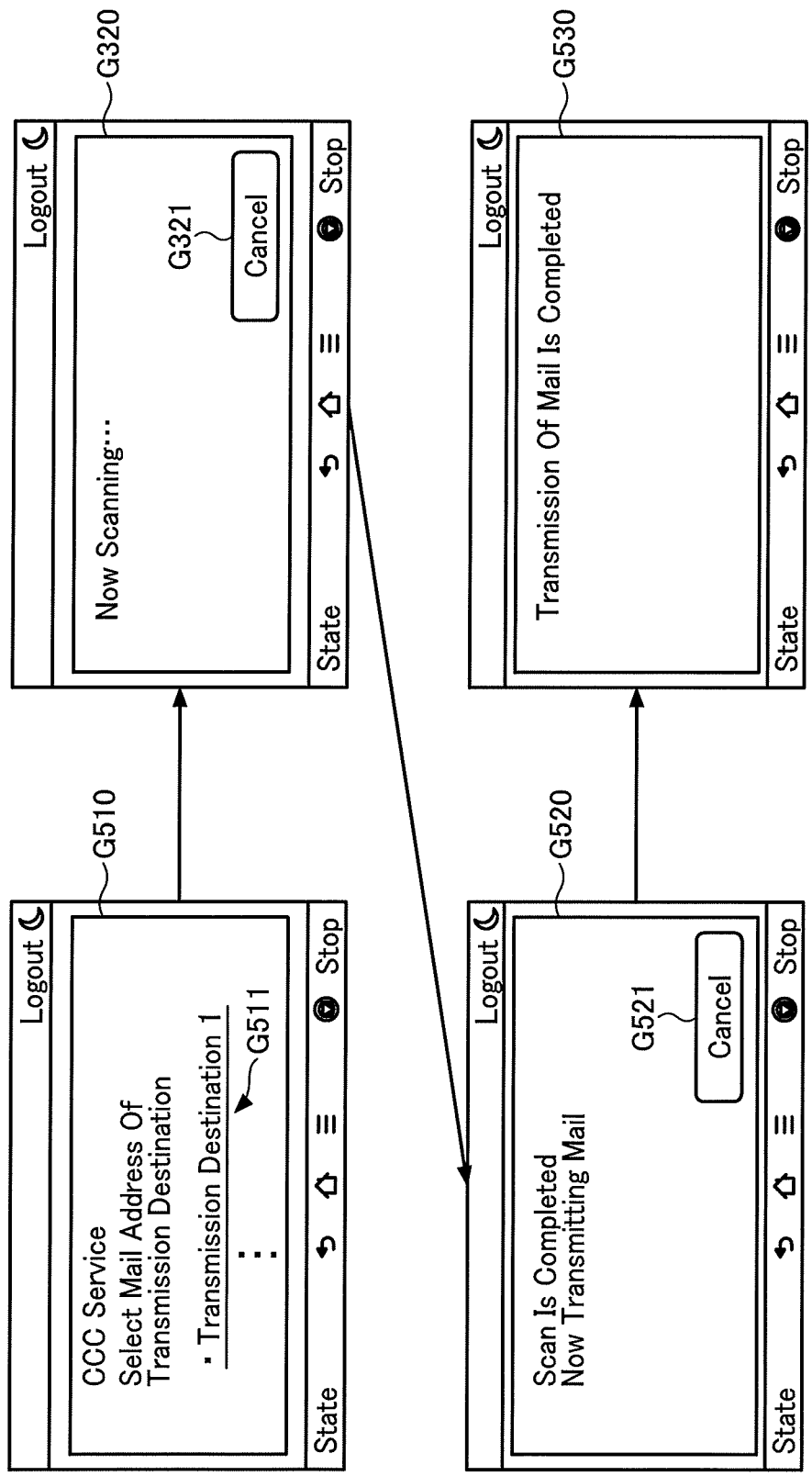
FIG. 22 is an illustration of another example of screen transition in the scanning process.

The UI unit 313 of the browser function unit 311 displays, for example, a web page G510 illustrated in FIG. 22 (S2101). The web page G510 illustrated in FIG. 22 is displayed when the interpretation unit 314 interprets content (HTML, CSS, Java Script, etc.,) obtained from the web server 20. The contents is obtained by, for example, inputting a URL for displaying the web page G510, or pressing a link to the URL.

The web page G510 illustrated in FIG. 22 includes a link G511 for sending an email to a mail address designated as a link destination. The user is assumed to press the link G511. It is also assumed that a document to be scan is set to the scanner of the image processing apparatus 10.

The UI unit 313 of the browser function unit 311 receives the pressing on the link G511 by the user (S2102). The link G511 included in the web page G510 illustrated in FIG. 22 is configured with an a tag (anchor tag) in which, for example, a "herf" attribute, is set, as illustrated in FIG. 23. With the "href" attribute in the a tag illustrated in FIG. 23, the mail address is specified with a scheme, "mailto". In addition to settings of the attributes mentioned above, other various attributes may also be set in the a tag.

The UI unit 313 of the browser function unit 311 transmits to the interpretation unit 314, an interpretation request to interpret the a tag, which implements the link G511 pressed by the user (S2103).

The interpretation unit 314 of the browser function unit 311 interprets the a tag, which implements the link G511 (S2104). That is, the interpretation unit 314 specifies mail transmission by interpreting the a tag, from the scheme of "mailto" specified by the "href" attribute in the a tag.

The interpretation unit 314 of the browser function unit 311, subsequently, transmits a mail transmission notification to the control unit 312 (S2105). The interpretation unit 314 transmits the mail transmission notification by calling an API for a mail transmission library included in the web browser 310 or an application of the control device 11, for example. Alternatively, the interpretation unit 314 may transmit the mail transmission notification by calling a mail transmission program (or mail transmission module) stored in the main device 12 via the web API. In calling the API, the mail address specified by the "href" attribute is used as a parameter.

Upon receiving the mail transmission notification, the control unit 312 transmits a scan execution request to the scan service unit 380 (S2106). The control unit 312 is capable of calling the scan UI application 330 of the scan service unit 380 using inten, for example.

Operation of S1507 and S1508 of FIG. 21 is substantially the same as the operation of S1507 and S1508 of FIG. 15 (FIGS. 15A and 15B) and the explanation of the operation is omitted here.

Subsequent to S1508, the scan service unit 380 displays, for example a scan completion/mail transmitting screen G520 illustrated in FIG. 22 (S2107). The scan service unit 380 also transmits to the control unit 312, a scan result (e.g., image data generated by scanning or information indicating a storage destination of the image data).

Upon receiving the scan result, the control unit 312 transmits to the e-mail address specified by the "href" attribute in the a tag, an e-mail to which the image data generated by the scan is attached (S2108). The image data generated by scanning is, accordingly, transmitted to the specified mail address.

The scan completion/mail transmitting screen G520 illustrated in FIG. 22 includes a cancel button G521. When the cancel button G521 is pressed by the user, the scan UI application 330 transmits a mail cancel request to the control unit 312. With this operation, the transmission of the mail to which the image data is attached is cancelled.

When completing the transmission of the mail, the control unit 312 transmits to the UI unit 313, a mail transmission completion notification (S2109).

Upon receiving the mail transmission completion notification, the UI unit 313 of the browser function unit 311 displays, for example, a mail transmission completion screen G530 illustrated in FIG. 22 (S2110). Displaying the mail transmission completion screen G530 illustrated in FIG. 22 allows the user to know that the transmission of the mail to which the image data generated by scanning is attached is completed.

As described above, the image processing apparatus 10 according to the variation 3 of the embodiment 2, generates image data by scanning with the scanner and transmits the mail to which the generated image data is attached when the link that is configured with a a tag that is the general-purpose HTML is pressed by the user.

Figure 24:
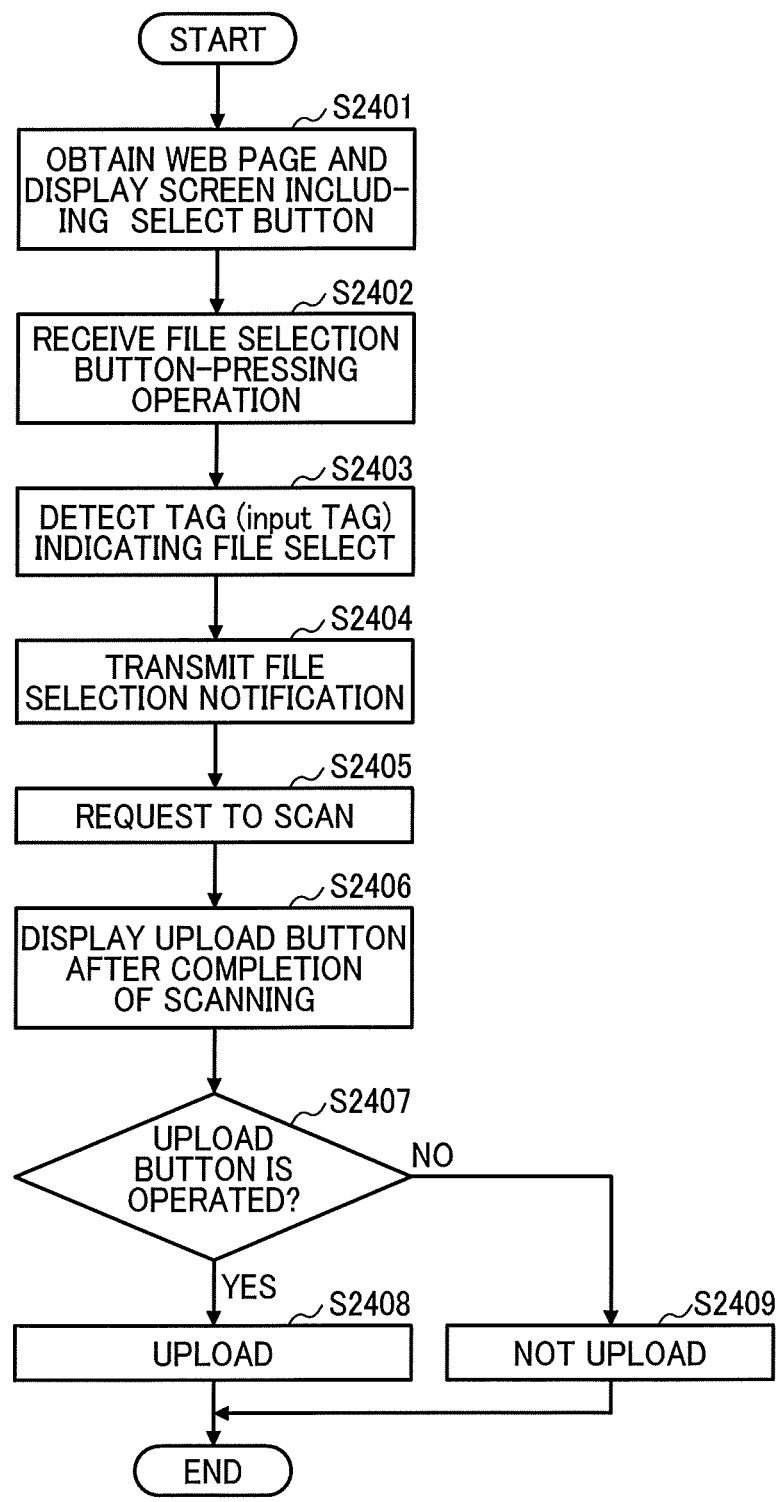
FIG. 24 is a flowchart illustrating operation of the web browser when the scanning process is performed.

One example of the operation of the web browser 310 in executing the printing process is described with reference to FIG. 24. FIG. 24 is a flowchart illustrating the operation of the web browser 310 when the printing process is performed.

As described in FIG. 15, in particular S1501, the web browser 310 obtains the content (web page) from the web server 20 and displays the screen including the selection (S2401).

As described in FIG. 15, in particular S1502, the web browser 310, subsequently, receives the pressing operation performed on the selection button by the user (S2402). When receiving the pressing operation performed on the selection button, the web browser 310 detects a predetermined tag (input tag) related to the file selection (S2403). As described in FIG. 15, in particular S1505, the web browser 310 transmits the file selection notification (S2404).

As described in FIG. 15, in particular S1506, the web browser 310, subsequently, transmits the scan execution request (S2405). As described in FIG. 15, in particular S1510, the web browser 310 displays the screen, for example, an upload screen, including the upload button after the scan is completed (S2406).

Subsequently, the web browser 310 determines whether the pressing on the upload button is received (S2407).

When determining that the pressing on the upload button is received in S2407, the web browser 310 executes upload, as described in FIG. 15, in particular S1512 (S2408).

When determining that the pressing on the upload execution button is not received in S2407 (for example, when the upload is cancelled), the web browser 310 does not execute the upload (S2409). In this case, the web browser 310 stores the image data generated by scanning. However, when the upload is not executed because of an error or the like, the web browser 310 may deletes the image data generated by scanning.

<Another Software Configuration>

Figure 25:
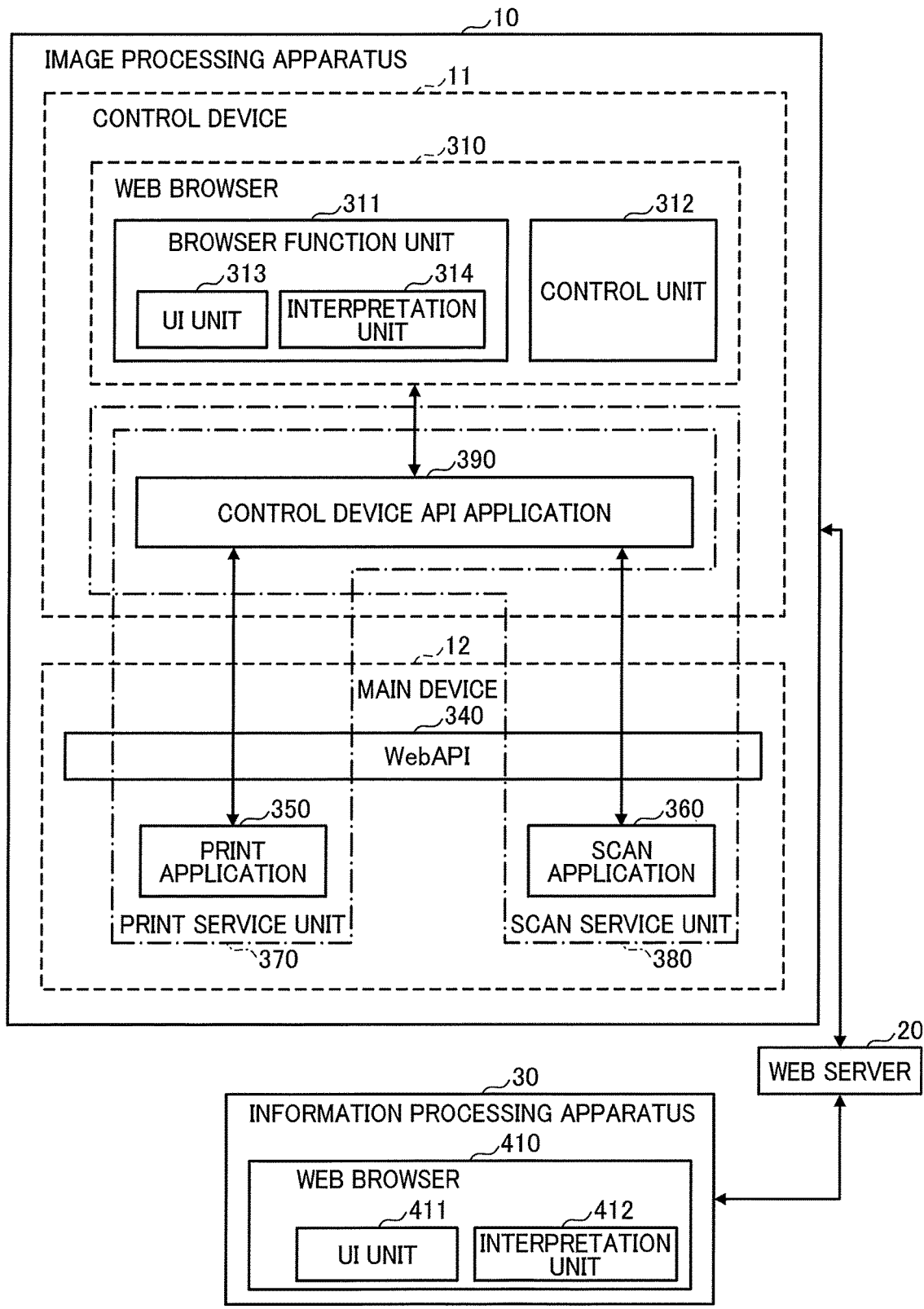
FIG. 25 is a diagram illustrating another example of the software configuration of the image processing system according to another embodiment.

A description is given of another software configuration of an image processing apparatus 10 and an information processing apparatus 30 included in an image processing system 1 according to another one of the embodiments with reference to FIG. 25. FIG. 25 is a diagram illustrating another example of the software configuration of the image processing system 1 according to the present embodiment.

As illustrated in FIG. 25, a control device 11 of the image processing apparatus 10 according to the present embodiment includes a control device API application 390, instead of the print UI application 320 and the scan UI application 330.

The control device API application 390 is an application program providing a UI related to image processing such as printing and scanning. The control device API application 390 has functions related to the image processing that are substantially the same as the functions of the print UI application 320 and the scan UI application 330.

With the software configuration illustrated in FIG. 25, a set of the print UI application 320 and the scan UI application 330 is replaceable with the control device API application 390 in Embodiment 1 and Embodiment 2 described above. Using the control device API application 390 collectively provides the UI related to various types of the image processing including printing and scanning.

The control device API application 390 includes an API group used by, for example, a third party for developing an application providing the UI related to the image processing. Using the API group of the control device API application 390 enables the third party to develop easily the application providing the UI related to the image processing without knowledge of a specification of the web API 340. That is, the control device API application 390 is an application program that provides the API group rapping the web API 340 to the third party.

In the software configuration illustrated in FIG. 25, the control device 11 includes the control device API application 390 instead of the print UI application 320 and the scan UI application 330, however the embodiments are not limited this. In some of the embodiments, the control device 11 includes the control device API application 390 in addition to the print UI application 320 and the scan UI application 330.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image processing apparatus comprising,
circuitry; and
an image processing device,
the circuitry being configured to cause a web browser to:
  interpret content obtained from a web server connected to the image processing apparatus via a network;
  display a screen based on the interpreted content;
  request the web server to perform processing, and the image processing device to perform image processing, each according to a user input on the displayed screen,
wherein the web server includes a web application,
wherein the screen includes a display component corresponding to the web application, and
wherein the circuitry requests the web server to perform the processing, according to a Hyper Text Markup Language (HTML) tag that implements the display component corresponding to the web application, in response to user operation of pressing on the display component of the screen.

2. The image processing apparatus of claim 1,
wherein the web server includes a plurality of web servers, each being configured to operate with the web browser to implement a plurality of web applications that are different from each other,
wherein the display component corresponds to one of the plurality of web applications, and
wherein the circuitry requests one of the web servers that operates with the one of the plurality of web applications to perform the processing, according to a Hyper Text Markup Language (HTML) tag that implements the display component corresponding to the one of the plurality of web applications, in response to user operation of pressing on the display component of the screen.

3. The image processing apparatus of claim 2,
wherein, when the HTML tag indicates a link to an electronic file stored in the web server, the circuitry requests the web server to download the electronic file, and
requests the image processing device to print the electronic file downloaded.

4. The image processing apparatus of claim 3, wherein the circuitry requests the image processing device to print the electronic file, according to information on a file format of the electronic file included in the HTML tag instructing to download the electronic file, the information indicating whether the electronic file is to be downloaded or downloaded and displayed, before printed.

5. The image processing apparatus of claim 3,
wherein the electronic file stored in the web server, indicated by the HTML tag, has a predetermined MIME type.

6. The image processing apparatus of claim 2,
wherein, when the HTML tag indicates selection of one of a plurality of electronic files stored in the image processing apparatus to be transmitted to the web server, the circuitry
requests the image processing device to scan a document to generate the electronic file, and
requests the web server to upload the generated electronic file.

7. The image processing apparatus of claim 6, wherein the circuitry requests the image processing device to scan and requests the web server to upload according to information indicating file selection included in the HTML tag.

8. The image processing apparatus of claim 6, wherein the circuitry requests the image processing device to scan and requests the web server to upload according to information indicating activating a camera included in the HTML tag.

9. The image processing apparatus of claim 1, further comprising:
a control device providing a browser function and an application program interface (API),
wherein:
the web browser is implemented with a Java application program; and
the circuitry interprets the content obtained from the web server, and displays the screen based on the interpreted content, using the browser function of the control device,
the Java application program calling the browser function via the application program interface (API) to implement the browser function.

10. The image processing apparatus of claim 1, further comprising:
a control device installed with a first program to provide a user interface; and
a main device including the image processing device, the image processing device installed with a second program to control the image processing and a web API used to request from the first program to the second program to perform the image processing.

11. The image processing apparatus of claim 10, wherein the web API includes a plurality of web APIs, and the first program provides an API group that wraps the plurality of web APIs.

12. The image processing apparatus of claim 10, wherein:
the control device and the main device operate individually and independently of each other with an operating system (OS) installed in each of the control device and the main device; and
the web browser and the first program operates under the OS installed in the control device.

13. An image processing system, comprising:
an information processing terminal installed with a web browser; and
an image processing apparatus configured to perform predetermined image processing;
the information processing terminal causes the web browser to:
  interpret content obtained from a web server connected to the image processing apparatus via a network;
  display a screen based on the interpreted content;

request the web server to perform processing, and the image processing apparatus to perform image processing, each according to a user input on the displayed screen, wherein the web server includes a web application, wherein the screen includes a display component corresponding to the web application, and wherein the image processing apparatus requests the web server to perform the processing, according to a Hyper Text Markup Language (HTML) tag that implements the display component corresponding to the web application, in response to user operation of pressing on the display component of the screen.

14. An image processing method, performed by an image processing apparatus installed with a web browser, comprising:

with the web browser, interpreting content obtained from a web server connected to the image processing apparatus via a network;

with the web browser, displaying a screen based on the interpreted content; and with the web browser, requesting the web server to perform processing, and the image processing apparatus to perform image processing, each according to a user input on the displayed screen, wherein the web server includes a web application, wherein the screen includes a display component corresponding to the web application, and wherein the image processing apparatus requests the web server to perform the processing, according to a Hyper Text Markup Language (HTML) tag that implements the display component corresponding to the web application, in response to user operation of pressing on the display component of the screen.

* * * * *